US010158736B2

United States Patent
Park et al.

(10) Patent No.: US 10,158,736 B2
(45) Date of Patent: Dec. 18, 2018

(54) METHOD FOR UPDATING PROXY SERVICE IN WIRELESS COMMUNICATION SYSTEM AND DEVICE THEREFOR

(71) Applicant: LG ELECTRONICS INC., Seoul (KR)

(72) Inventors: Hyunhee Park, Seoul (KR); Byungjoo Lee, Seoul (KR); Giwon Park, Seoul (KR); Dongcheol Kim, Seoul (KR); Youngjun Jo, Seoul (KR); Taesung Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/743,649

(22) PCT Filed: Jul. 6, 2016

(86) PCT No.: PCT/KR2016/007302
§ 371 (c)(1),
(2) Date: Jan. 10, 2018

(87) PCT Pub. No.: WO2017/010731
PCT Pub. Date: Jan. 19, 2017

(65) Prior Publication Data
US 2018/0205800 A1 Jul. 19, 2018

Related U.S. Application Data

(60) Provisional application No. 62/193,573, filed on Jul. 16, 2015, provisional application No. 62/190,746, filed on Jul. 10, 2015.

(51) Int. Cl.
*H04W 8/00* (2009.01)
*H04L 29/08* (2006.01)
(Continued)

(52) U.S. Cl.
CPC .............. *H04L 67/28* (2013.01); *H04W 4/00* (2013.01); *H04W 60/02* (2013.01); *H04W 84/18* (2013.01); *H04W 88/182* (2013.01)

(58) Field of Classification Search
CPC ...... H04L 67/28; H04W 60/02; H04W 88/182
See application file for complete search history.

(56) References Cited

U.S. PATENT DOCUMENTS

2016/0226928 A1* 8/2016 Park .................... H04L 65/1073
2016/0270137 A1* 9/2016 Yong .................... H04W 8/005
(Continued)

FOREIGN PATENT DOCUMENTS

KR         101330406       11/2013
KR     1020150025593       3/2015
(Continued)

OTHER PUBLICATIONS

PCT International Application No. PCT/KR2016/007302, Written Opinion of the International Searching Authority dated Sep. 12, 2016, 16 pages.

*Primary Examiner* — Nathan Taylor
(74) *Attorney, Agent, or Firm* — Lee, Hong, Degerman, Kang & Waimey

(57) ABSTRACT

The present specification can provide a method by which a NAN proxy client updates a proxy service in a wireless communication system, wherein the method by which a NAN proxy client updates a proxy service.

15 Claims, 17 Drawing Sheets

(51) Int. Cl.
*H04W 4/00* (2018.01)
*H04W 60/02* (2009.01)
*H04W 84/18* (2009.01)
*H04W 88/18* (2009.01)

(56) References Cited

U.S. PATENT DOCUMENTS

2016/0352782 A1* 12/2016 Patil ...................... H04L 65/105
2016/0352842 A1* 12/2016 Patil ........................ H04L 67/16
2016/0353269 A1* 12/2016 Kasslin ................. H04W 8/005
2018/0139600 A1*  5/2018 Kim ........................ H04W 8/00
2018/0213388 A1*  7/2018 Kim ..................... H04W 8/005

FOREIGN PATENT DOCUMENTS

| WO | 2014150977 | 9/2014 |
| WO | 2015038272 | 3/2015 |
| WO | 2015069041 | 5/2015 |

* cited by examiner

FIG. 16
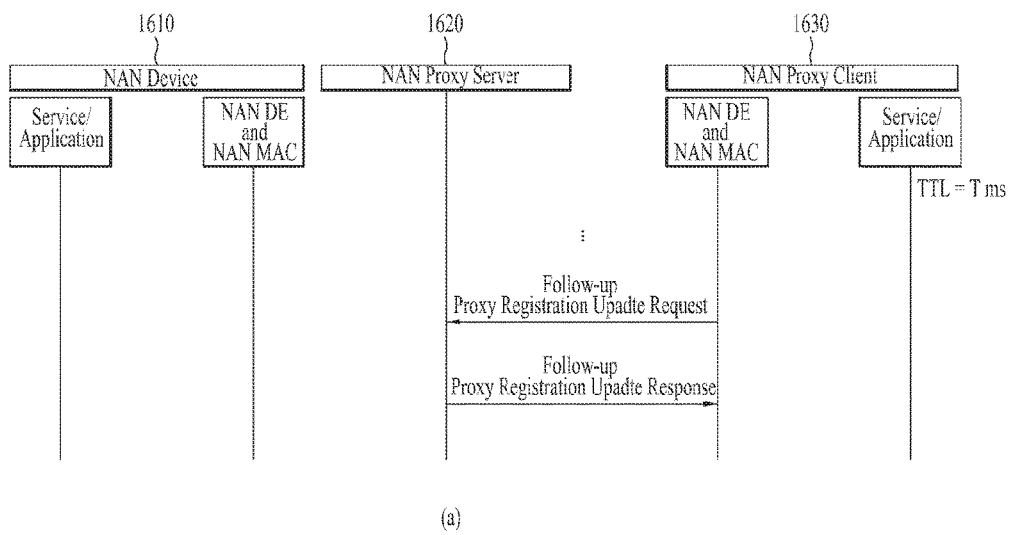
(a)
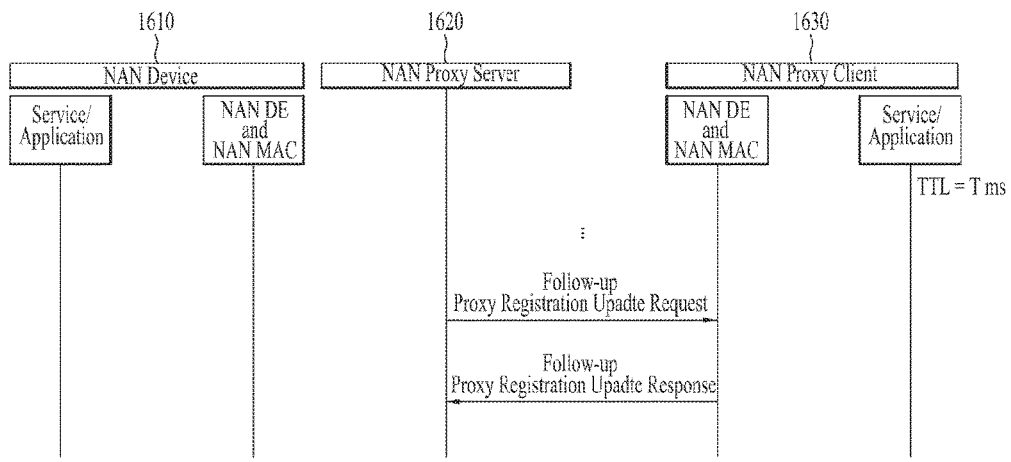
(b)

METHOD FOR UPDATING PROXY SERVICE IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2016/007302, filed on Jul. 6, 2016, which claims the benefit of U.S. Provisional Application Nos. 62/190,746, filed on Jul. 10, 2015, and 62/193,573, filed on Jul. 16, 2015, the contents of which are all hereby incorporated by reference herein in their entirety.

TECHNICAL FIELD

The present invention relates to a wireless communication system, and more particularly, to a method of updating a proxy service in a wireless communication system.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable device such as a personal digital assistant (PDA), a laptop computer, a portable multimedia player (PMP), etc. based on a radio frequency technology.

DISCLOSURE

Technical Problem

An object of the present invention devised to solve the problem lies in a method and device for updating a neighbor awareness networking (NAN) proxy service in a wireless communication system.

Another object of the present invention devised to solve the problem lies in a method of exchanging a message for updating a proxy service to an NAN proxy server by an NAN proxy client.

Another object of the present invention devised to solve the problem lies in a method of maintaining and managing a proxy service of an NAN proxy client by an NAN proxy server.

Technical Solution

The object of the present invention can be achieved by providing a method of updating a proxy service by a neighbor awareness networking (NAN) proxy client in a wireless communication system. The method may include transmitting a Proxy Registration Request to an NAN proxy server, receiving a Proxy Registration Response from the NAN proxy server, transmitting a Proxy Registration Update Request to the NAN proxy server, and receiving a Proxy Registration Update Response from the NAN proxy server. The Proxy Registration Request may include information on Time to live (TTL) of a proxy service and a proxy service of the NAN proxy client may be consigned to the NAN proxy server for a time corresponding to the information on the TTL of the proxy service. The Proxy Registration Update Request may be periodically transmitted based on an update period. The update period may be set to be smaller than a time corresponding to the information on the TTL of the proxy service.

In another aspect of the present invention, provided herein is a neighbor awareness networking (NAN) proxy client for updating a proxy service in a wireless communication system. The NAN proxy client may include a reception module configured to receive information from an external device, a transmission module configured to transmit information to the external device, and a processor configured to control the reception module and the transmission module. The processor may transmit a Proxy Registration Request to an NAN proxy server using the transmission module, receive a Proxy Registration Response from the NAN proxy server using the reception module, transmit a Proxy Registration Update Request to the NAN proxy server using the transmission module, and receive a Proxy Registration Update Response from the NAN proxy server using the reception module. The Proxy Registration Request may include information on Time to live (TTL) of a proxy service and a proxy service of the NAN proxy client may be consigned to the NAN proxy server for a time corresponding to the information on the TTL of the proxy service. The Proxy Registration Update Request may be periodically transmitted based on an update period. The update period may be set to be smaller than a time corresponding to the information on the TTL of the proxy service.

The following features may be commonly applied to the method and device for updating a proxy service by a proxy client in a wireless communication system.

The Proxy Registration Update Request may include information on TTL of a registered service.

When the NAN proxy server receives the Proxy Registration Update Request, a time for which the proxy service of the NAN proxy client may be consigned is updated based on the TTL of the registered service.

The update period may be set to be smaller than a time corresponding to the TTL of the registered service.

When a service change event occurs during the update period, the NAN proxy client may transmit the proxy registration update to the NAN proxy server before a time corresponding to the update period is reached.

When the proxy registration update is transmitted to the NAN proxy server before the time corresponding to the update period is reached, the NAN proxy server may update the proxy service based on the proxy registration update.

When the NAN proxy client does not transmit the Proxy Registration Update Request for a predetermined time after receiving the proxy registration response, the NAN proxy server may transmit the Proxy Registration Update Request to the NAN proxy client.

When the Proxy Registration Update Request is received from the NAN proxy server, the Proxy Registration Update Response may be transmitted to the NAN proxy server.

The predetermined time may be set to be smaller than a time for which the proxy service is consigned and may be set to be greater than the update period.

Advantageous Effects

The present specification may provide a method and device for updating a neighbor awareness networking (NAN) proxy service in a wireless communication system.

The present specification may provide a method of exchanging a message for updating a proxy service to an NAN proxy server by an NAN proxy client.

The present specification may provide a method of maintaining and managing a proxy service of an NAN proxy client by an NAN proxy server.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 8 is a diagram illustrating a discovery window, and the like;

FIG. 16 is a diagram showing a method of performing a proxy registration update procedure;

BEST MODE

Figure 1:
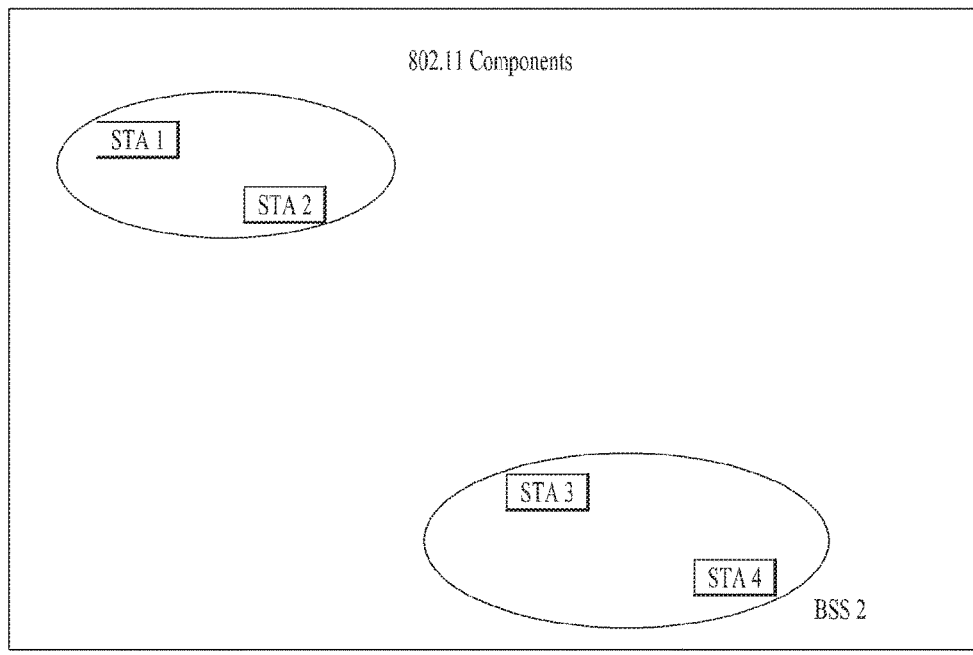
FIG. 1 is a diagram for an example of a structure of IEEE 802.11 system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

In the specification, when a part "comprises" or "includes" an element, it means that the part further comprises or includes another element unless otherwise mentioned. Also, the terms ". . . unit", " . . . module" disclosed in the specification means a unit for processing at least one function or operation, and may be implemented by hardware, software or combination of hardware and software.

For clarity, the following description focuses on IEEE 802.11 systems. However, technical features of the present invention are not limited thereto.

Structure of WLAN System

FIG. 1 is a diagram illustrating an exemplary structure of IEEE 802.11 system to which the present invention is applicable.

IEEE 802.11 structure may include a plurality of components and WLAN supportive of transparent STA mobility for an upper layer can be provided by interactions between the components. A basic service set (BSS) may correspond to a basic component block in IEEE 802.11 WLAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communication. This area may be called a basic service area (BSA). Once the STA moves out of the BSA, it is unable to directly communicate with other STAs within the corresponding BSA.

A most basic type of BSS in IEEE 802.11 WLAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. Moreover, the above-mentioned WLAN is not configured according to a devised plan but can be configured under the necessity of WLAN. And, this may be called an ad-hoc network.

If an STA is turned on/off or enters/escapes from a BSS area, membership of the STA in a BSS can be dynamically changed. In order to obtain the membership of the BSS, the STA can join the BSS using a synchronization procedure. In order to access all services of the BSS based structure, the STA should be associated with the BSS. This association may be dynamically configured or may include a use of a DSS (distribution system service).

Additionally, FIG. 1 shows components such as a DS (distribution system), a DSM (distribution system medium), an AP (access point) and the like.

In WLAN, a direct station-to-station distance can be restricted by PHY capability. In some cases, the restriction of the distance may be sufficient enough. However, in some cases, communication between stations located far away from each other may be necessary. In order to support extended coverage, the DS (distribution system) may be configured.

The DS means a structure in which BSSs are interconnected with each other. Specifically, the BSS may exist as an extended type of component of a network consisting of a plurality of BSSs instead of an independently existing entity as shown in FIG. 1.

The DS corresponds to a logical concept and can be specified by a characteristic of the DSM. Regarding this, IEEE 802.11 standard logically distinguishes a wireless medium (WM) from the DSM. Each of the logical media is used for a different purpose and is used as a different component. According to the definition of the IEEE 802.11 standard, the media are not limited to be identical to each other or to be different from each other. Since a plurality of the media are logically different from each other, flexibility of IEEE 802.11 WLAN structure (a DS structure or a different network structure) can be explained. In particular, the IEEE 802.11 WLAN structure can be implemented in various ways and the WLAN structure can be independently specified by a physical characteristic of each implementation case.

The DS can support a mobile device in a manner of providing seamless integration of a plurality of BSSs and logical services necessary for handling an address to a destination.

The AP enables associated STAs to access the DS through the WM and corresponds to an entity having STA functionality. Data can be transferred between the BSS and the DS through the AP. For instance, as shown in FIG. 1, while each of the STA 2 and STA 3 have STA functionality, the STA 2 and STA 3 provide functions of enabling associated STAs (STA 1 and STA 4) to access the DS. And, since all APs basically correspond to an STA, all APs correspond to an addressable entity. An address used by the AP for communication in the WM should not be identical to an address used by the AP for communication in the DSM.

Data transmitted from one of STAs associated with an AP to an STA address of the AP is always received in an uncontrolled port and the data can be processed by an IEEE 802.1X port access entity. Moreover, if a controlled port is authenticated, transmission data (or frame) can be delivered to a DS.

Layer Structure

Operations of the STA which operates in a wireless LAN system can be explained in terms of the layer structure. In terms of a device configuration, the layer structure can be implemented by a processor. The STA may have a structure of a plurality of layers. For example, a main layer structure handled in the 802.11 standard document includes a MAC sublayer and a physical (PHY) layer on a data link layer (DLL). The PHY layer may include a physical layer convergence procedure (PLCP) entity, a physical medium dependent (PMD) entity, etc. The MAC sublayer and the PHY layer conceptually include management entities called MAC sublayer management entity (MLME) and physical layer management entity (PLME), respectively. These entities provide a layer management service interface for performing a layer management function.

A station management entity (SME) is present within each STA in order to provide an accurate MAC operation. The SME is a layer-independent entity that may be considered as existing in a separate management plane or as being off to the side. Detailed functions of the SME are not specified in this document but it may be generally considered as being responsible for functions of gathering layer-dependent status from the various layer management entities (LMEs), setting values of layer-specific parameters similar to each other. The SME may perform such functions on behalf of general system management entities and may implement a standard management protocol.

The aforementioned entities interact with each other in various ways. For example, the entities may interact with each other by exchanging GET/SET primitives. The primitive means a set of elements or parameters related to a specific purpose. XX-GET.request primitive is used for requesting a value of a given MIB attribute (management information based attribute). XX-GET.confirm primitive is used for returning an appropriate MIB attribute value if a status is 'success', otherwise it is used for returning an error indication in a status field. XX-SET.request primitive is used to request that an indicated MIB attribute be set to a given value. If this MIB attribute implies a specific action, this requests that the action be performed. And, XX-SET.confirm primitive is used such that, if the status is 'success', this confirms that the indicated MIB attribute has been set to the requested value, otherwise it is used to return an error condition in the status field. If this MIB attribute implies a specific action, this confirms that the action has been performed.

Moreover, the MLME and the SME may exchange various MLME_GET/SET primitives through an MLME SAP (service access point). Furthermore, various PLME_GET/SET primitives may be exchanged between the PLME and the SME through PLME_SAP and may be exchanged between the MLME and the PLME through an MLME-PLME_SAP.

NAN (Neighbor Awareness Network) Topology

Figure 2:
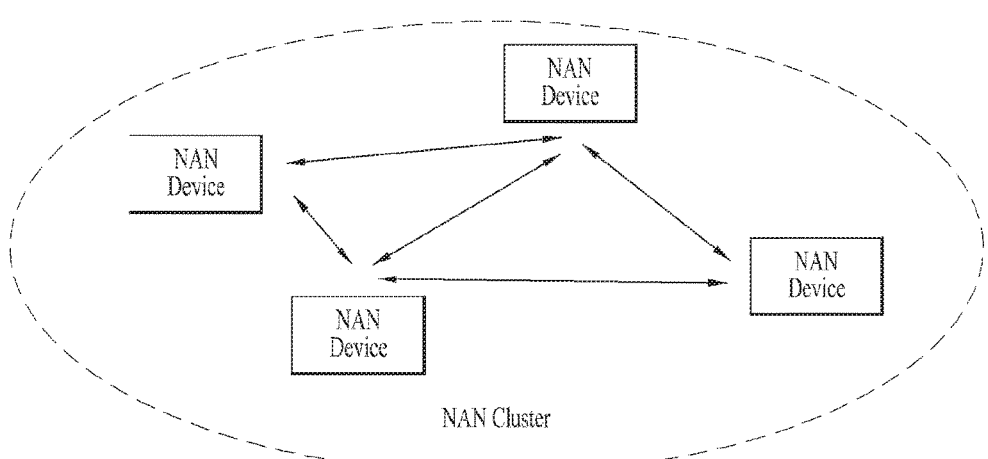
FIGS. 2 to 3 are diagrams for examples of a NAN cluster.
Figure 3:
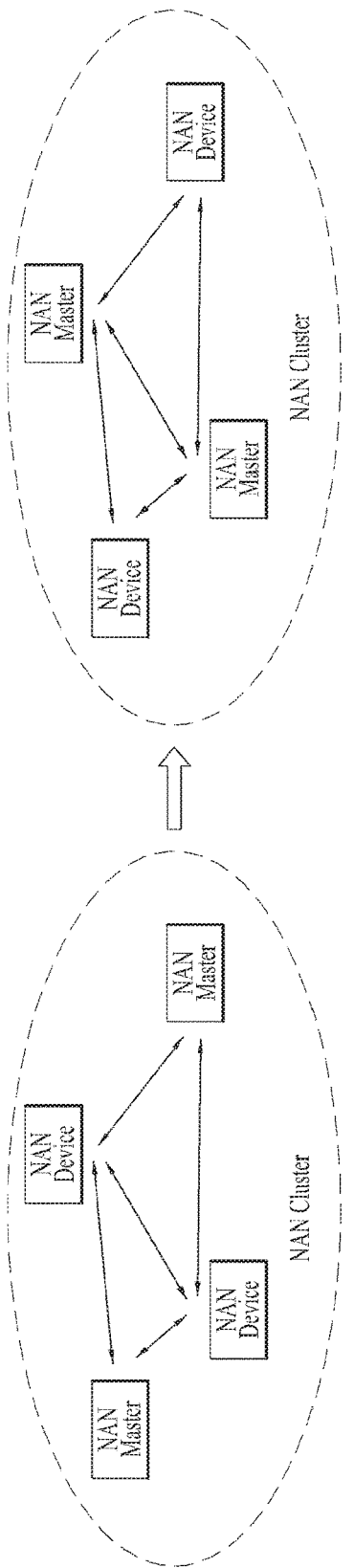

A NAN network can be constructed with NAN devices (devices) that use a set of identical NAN parameters (e.g., a time interval between consecutive discovery windows, an interval of a discovery window, a beacon interval, a NAN channel, etc.). A NAN cluster can be formed by NAN devices and the NAN cluster means a set of NAN devices that are synchronized on the same discovery window schedule. And, a set of the same NAN parameters is used in the NAN cluster. FIG. 2 illustrates an example of the NAN cluster. A NAN device included in the NAN cluster may directly transmit a multicast/unicast service discovery frame to a different NAN device within a range of the discovery window. As shown in FIG. 3, at least one NAN master may exist in a NAN cluster and the NAN master may be changed. Moreover, the NAN master may transmit all of a synchronization beacon frame, discovery beacon frame and service discovery frame.

NAN Device Architecture

Figure 4:
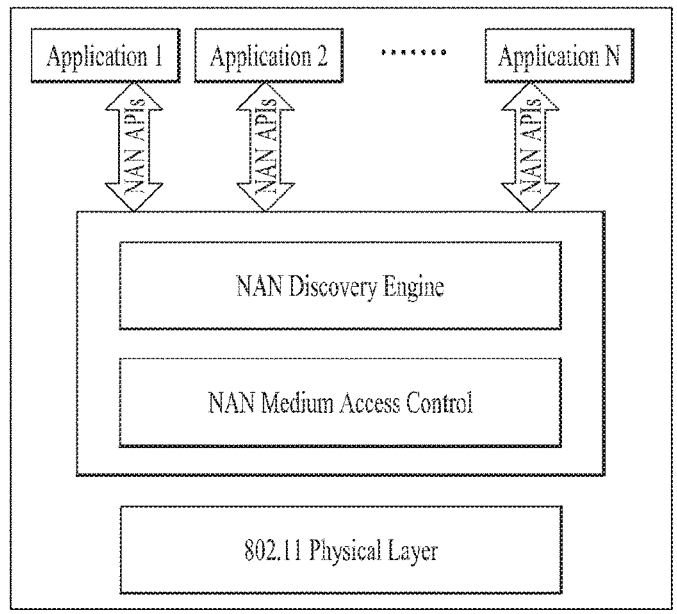
FIG. 4 is a diagram for an example of a structure of a NAN terminal.

FIG. 4 illustrates an example of a structure of a NAN device (device). Referring to FIG. 4, the NAN device is based on a physical layer in 802.11 and its main components correspond to a NAN discovery engine, a NAN MAC (medium access control), and NAN APIs connected to respective applications (e.g., Application 1, Application 2, . . . , Application N).

Figure 5:
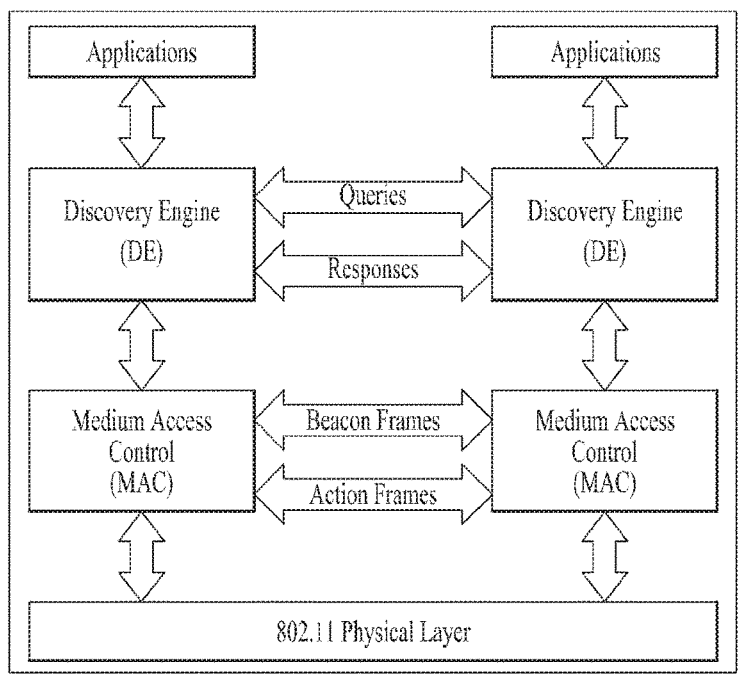
FIGS. 5 to 6 are diagrams illustrating a relation between NAN components.
Figure 6:
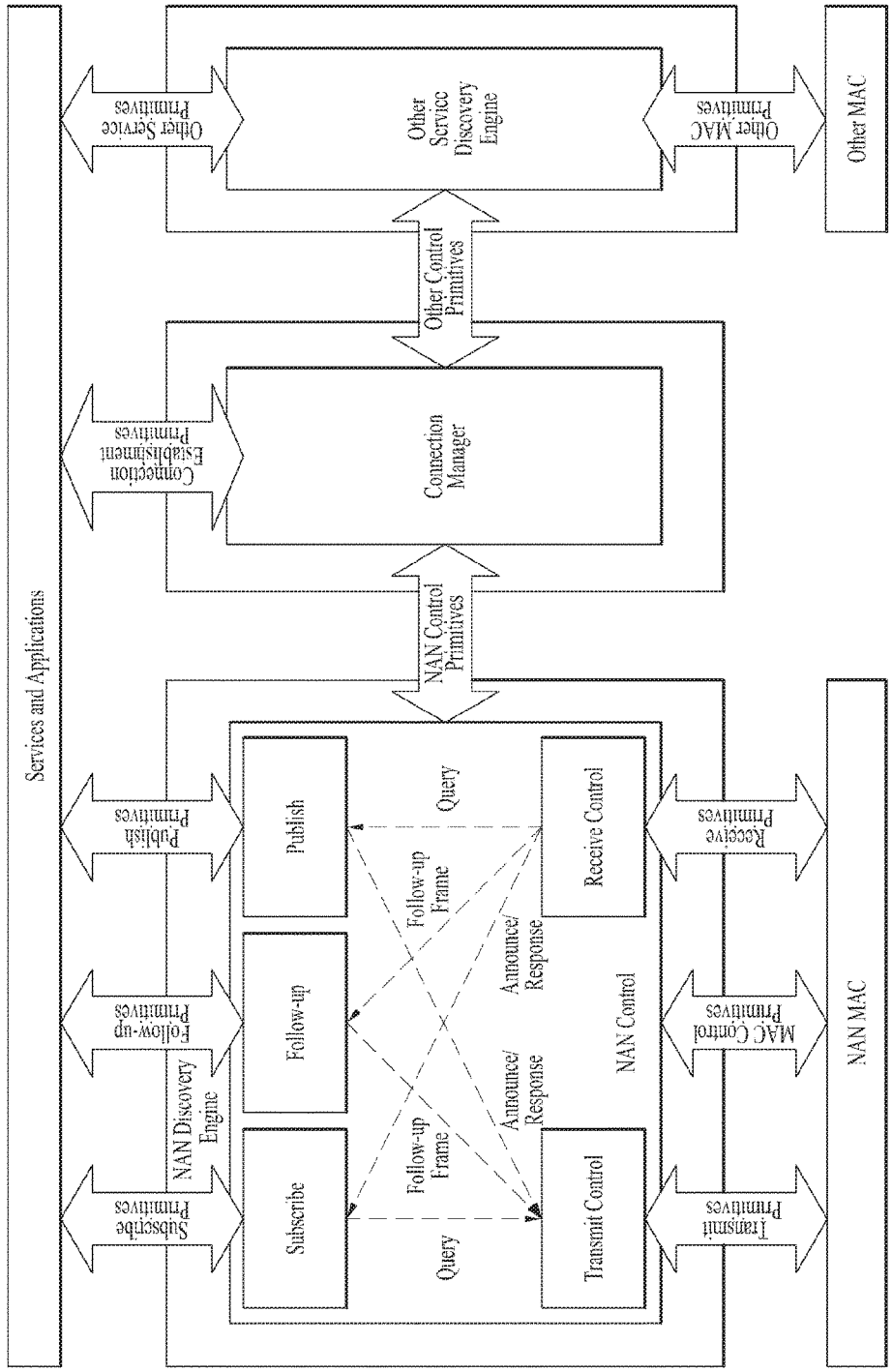

FIGS. 5 and 6 illustrate relations between NAN components. Service requests and responses are processed through the NAN discovery engine, and the NAN beacon frames and the service discovery frames are processed by the NAN MAC. The NAN discovery engine may provide functions of subscribing, publishing, and following-up. The publish/subscribe functions are operated by services/applications through a service interface. If the publish/subscribe commands are executed, instances for the publish/subscribe functions are generated. Each of the instances is driven independently and a plurality of instances can be driven simultaneously in accordance with the implementation. The follow-up function corresponds to means for the services/applications that transceive specific service information.

Role and State of NAN Device

Figure 7:
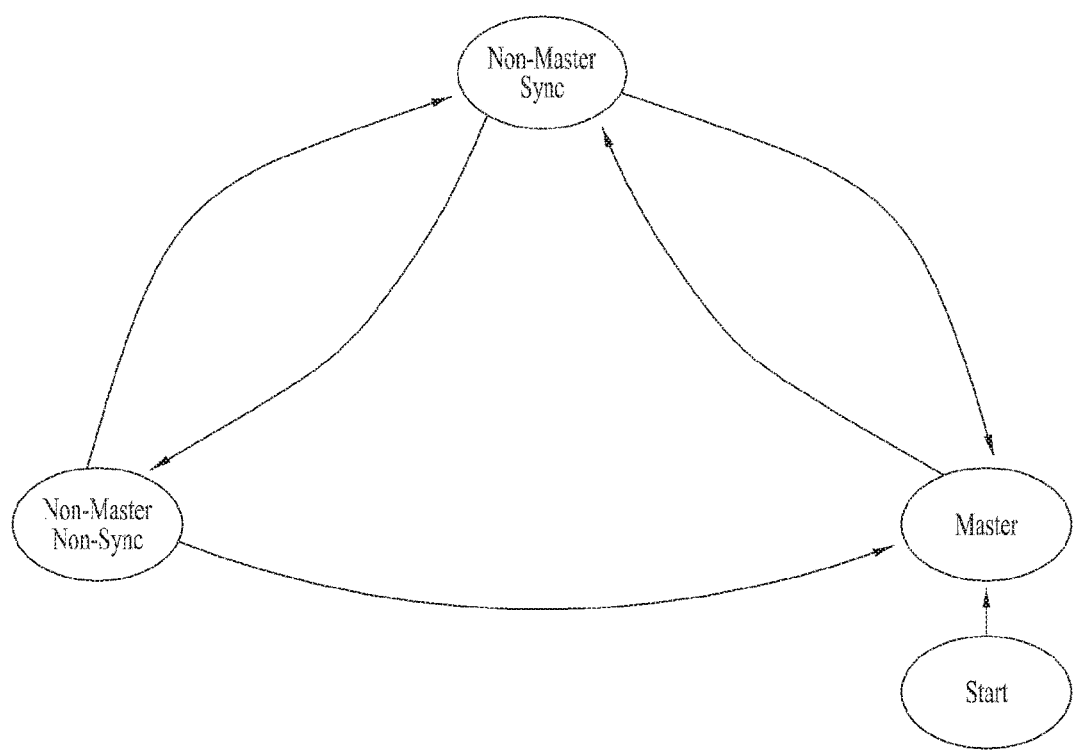
FIG. 7 is a diagram illustrating a state transition of a NAN terminal.

As mentioned in the foregoing description, a NAN device (device) can serve as a NAN master and the NAN master can be changed. In other words, roles and states of the NAN device can be shifted in various ways and related examples are illustrated in FIG. 7. The roles and states, which the NAN device can have, may include a master (hereinafter, the master means a state of master role and sync), a Non-master sync, and a Non-master Non-sync. Transmission availability of the discovery beacon frame and/or the synchronization beacon frame can be determined according to each of the roles and states and it may be set as illustrated in Table 1.

TABLE 1

| Role and State | Discovery Beacon | Synchronization Beacon |
| --- | --- | --- |
| Master | Transmission Possible | Transmission Possible |
| Non-Master Sync | Transmission Impossible | Transmission Possible |
| Non-Master Non-Sync | Transmission Impossible | Transmission Impossible |

The state of the NAN device can be determined according to a master rank (MR). The master rank indicates the preference of the NAN device to serve as the NAN master. In particular, a high master rank means strong preference for the NAN master. The NAN MR can be determined by Master Preference, Random Factor, Device MAC address, and the like according to Formula 1.

$$\text{MasterRank} = \text{MasterPreference} * 2^{56} + \text{RandomFactor} * 2^{48} + \text{MAC}[5] * 2^{40} + \ldots + \text{MAC}[0] \quad \text{[Formula 1]}$$

In Formula 1, the Master Preference, Random Factor, Device MAC address may be indicated through a master indication attribute. The master indication attributes may be set as illustrated in Table 2.

TABLE 2

| Field Name | Size (Octets) | Value | Description |
| --- | --- | --- | --- |
| Attribute ID | 1 | 0x00 | Identifies the type of NAN attribute. |
| Length | 2 | 2 | Length of the following field in the attribute |
| Master Preference | 1 | 0-255 | Information that is used to indicate a NAN Device's preference to serve as the role of Master, with a larger value indicating a higher preference. |
| Random Factor | 1 | 0-255 | A random number selected by the sending NAN Device. |

Regarding the above MR, in case of a NAN device that activates a NAN service and initiates a NAN cluster, each of the Master Preference and the Random Factor is set to 0 and NANWarmUp is reset. The NAN device should set a Master Preference field value in the master indication attribute to a value greater than 0 and a Random Factor value in the master indication attribute to a new value until when the NANWarmUp expires. When a NAN device joins a NAN cluster in which the Master Preference of an anchor master is set to a value greater than 0, the corresponding NAN device may set the Master Preference to a value greater than 0 and the Random Factor to a new value irrespective of expiration of the NANWarmUp.

Moreover, a NAN device can become an anchor master of a NAN cluster depending on an MR value. That is, all NAN devices have capabilities of operating as the anchor master. The anchor master means the device that has a highest MR and a smallest AMBTT (anchor master beacon transmit time) value and has a hop count (HC) (to the anchor master) set to 0 in the NAN cluster. In the NAN cluster, two anchor masters may exist temporarily but a single anchor master is a principle of the NAN cluster. If a NAN device becomes an anchor master of a currently existing NAN cluster, the NAN device adopts TSF used in the currently existing NAN cluster without any change.

The NAN device can become the anchor master in the following cases: if a new NAN cluster is initiated; if the master rank is changed (e.g., if an MR value of a different NAN device is changed or if an MR value of the anchor master is changed); or if a beacon frame of the current anchor master is not received any more. In addition, if the MR value of the different NAN device is changed or if the MR value of the anchor master is changed, the NAN device may lose the status of the anchor master. The anchor master can be determined according to an anchor master selection algorithm in the following description. In particular, the anchor master selection algorithm is the algorithm for determining which NAN device becomes the anchor master of the NAN cluster. And, when each NAN device joins the NAN cluster, the anchor master selection algorithm is driven.

If a NAN device initiates a new NAN cluster, the NAN device becomes the anchor master of the new NAN cluster. If a NAN synchronization beacon frame has a hop count in excess of a threshold, the NAN synchronization beacon frame is not used by NAN devices. And, other NAN synchronization beacon frames except the above-mentioned NAN synchronization beacon frame are used to determine the anchor master of the new NAN cluster.

If receiving the NAN synchronization beacon frame having the hop count equal to or less than the threshold, the NAN device compares an anchor master rank value in the beacon frame with a stored anchor master rank value. If the stored anchor master rank value is greater than the anchor master value in the beacon frame, the NAN device discards the anchor master value in the beacon frame. If the stored anchor master value is less than the anchor master value in the beacon frame, the NAN device newly stores values greater by 1 than the anchor master rank and the hop count included in the beacon frame and an AMBTT value in the beacon frame. If the stored anchor master rank value is equal to the anchor master value in the beacon frame, the NAN device compares hop counters. Then, if a hop count value in the beacon frame is greater than a stored value, the NAN device discards the received beacon frame. If the hop count value in the beacon frame is equal to (the stored value−1) and if an AMBTT value is greater than the stored value, the NAN device newly stores the AMBTT value in the beacon frame. If the hop count value in the beacon frame is less than (the stored value−1), the NAN device increases the hop count value in the beacon frame by 1. The stored AMBTT value is updated according to the following rules. If the received beacon frame is transmitted by the anchor master, the AMBTT value is set to the lowest four octets of time stamp included in the received beacon frame. If the received beacon frame is transmitted from a NAN master or non-master sync device, the AMBTT value is set to a value included in a NAN cluster attribute in the received beacon frame.

Meanwhile, a TSF timer of a NAN device exceeds the stored AMBTT value by more than 16*512 TUs (e.g., 16 DW periods), the NAN device may assume itself as an anchor master and then update an anchor master record. In addition, if any of MR related components (e.g., Master Preference, Random Factor, MAC Address, etc.) is changed, a NAN device not corresponding to the anchor master compares the changed MR with a stored value. If the changed MR of the NAN device is greater than the stored value, the corresponding NAN device may assume itself as the anchor master and then update the anchor master record.

Moreover, a NAN device may set anchor master fields of the cluster attributes in the NAN synchronization and discovery beacon frames to values in the anchor master record, except that the anchor master sets the AMBTT value to a TSF value of corresponding beacon transmission. The NAN device, which transmits the NAN synchronization beacon frame or the discovery beacon frame, may be confirmed that the TSF in the beacon frame is derived from the same anchor master included in the cluster attribute.

Moreover, a NAN device may adopt a TSF timer value in a NAN beacon received with the same cluster ID in the following case: i) if the NAN beacon indicates an anchor master rank higher than a value in an anchor master record of the NAN device; or ii) if the NAN beacon indicates an anchor master rank equal to the value in the anchor master record of the NAN device and if a hop count value and an AMBTT value in the NAN beacon frame are larger values in the anchor master record.

NAN Synchronization

NAN devices (devices) participating in the same NAN Cluster may be synchronized with respect to a common clock. A TSF in the NAN cluster can be implemented through a distributed algorithm that should be performed by all the NAN devices. Each of the NAN devices participating in the NAN cluster may transmit NAN synchronization beacon frame (NAN sync beacon frame) according to the above-described algorithm. The NAN device may synchronize its clock during a discovery window (DW). A length of the DW corresponds to 16 TUs. During the DW, one or more NAN devices may transmit synchronization beacon frames in order to help all NAN devices in the NAN cluster synchronize their own clocks.

NAN beacon transmission is distributed. A NAN beacon frame is transmitted during a DW period existing at every 512 TU. All NAN devices can participate in generation and transmission of the NAN beacon according to their roles and states. Each of the NAN devices should maintain its own TSF timer used for NAN beacon period timing. A NAN synchronization beacon interval can be established by the NAN device that generates the NAN cluster. A series of TBTTs are defined so that the DW periods in which synchronization beacon frames can be transmitted are assigned exactly 512 TUs apart. Time zero is defined as a first TBTT and the discovery window starts at each TBTT.

Figure 8:
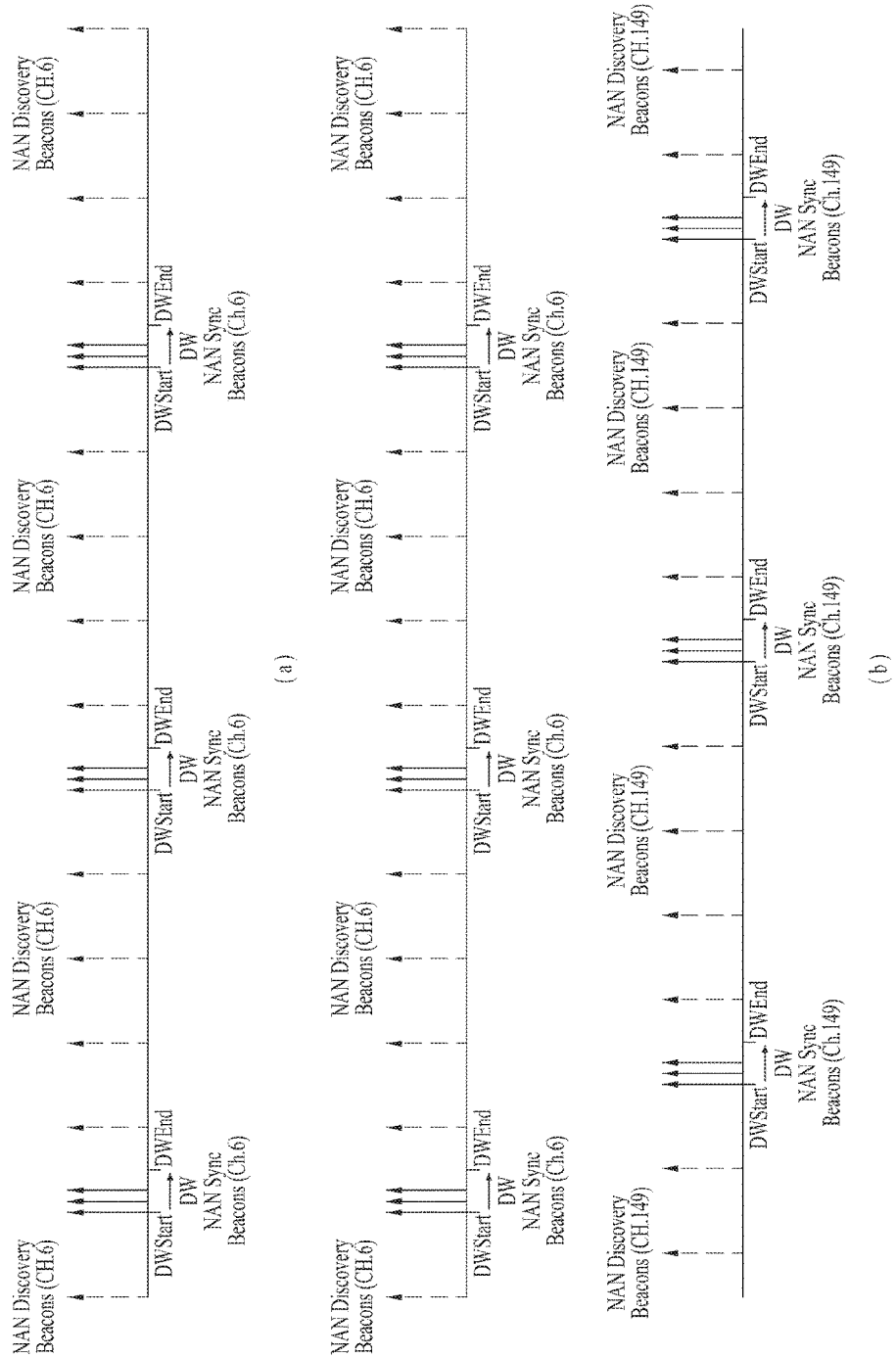

Each NAN device serving as a NAN master transmits a NAN discovery beacon frame from out of a NAN discovery window. On average, the NAN device serving as the NAN master transmits the NAN discovery beacon frame every 100 TUs. A time interval between consecutive NAN discovery beacon frames is smaller than 200 TUs. If a scheduled transmission time overlaps with a NAN discovery window of the NAN cluster in which the corresponding NAN device participates, the NAN device serving as the NAN master is able to omit transmission of the NAN discovery beacon frame. In order to minimize power required to transmit the NAN discovery beacon frame, the NAN device serving as the NAN master may use AC_VO (WMM Access Category—Voice) contention setting. FIG. 8 illustrates relations between a discovery window and a NAN discovery beacon frame and transmission of NAN synchronization/discovery beacon frames. Particularly, FIG. 8 (*a*) shows transmission of NAN discovery and synchronization beacon frames of a NAN device operating in 2.4 GHz band. FIG. 8 (*b*) shows transmission of NAN discovery and synchronization beacon frames of a NAN device operating in 2.4 GHz and 5 GHz bands.

Figure 9:
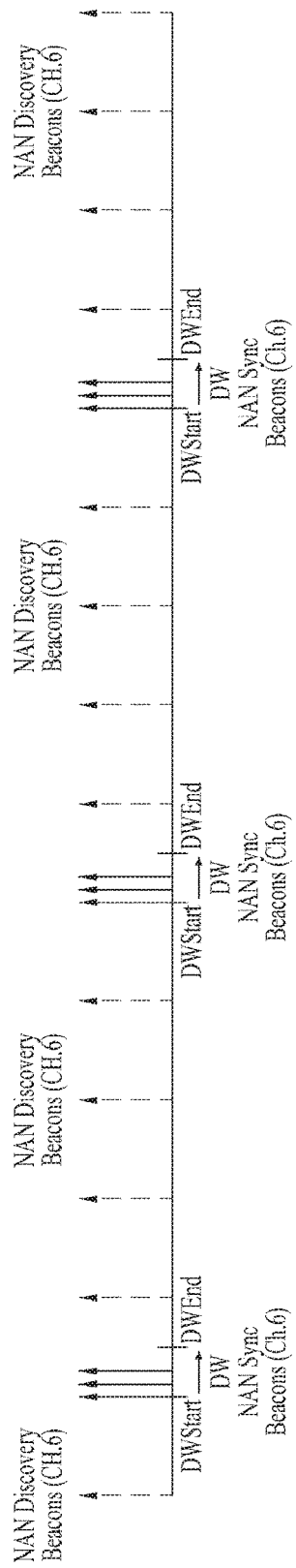
FIG. 9 is a diagram illustrating a discovery window.

FIG. 9 is a diagram illustrating a discovery window. As mentioned in the foregoing description, each NAN terminal performing a master role transmits a synchronization beacon frame within a discovery window and transmits a discovery beacon frame at the outside of the discovery window. In this case, as mentioned in the foregoing description, the discovery window can be repeated in every 512 TU. In this case, duration of the discovery window may correspond to 16 TUs. In particular, the discovery window can last during 16 TUs. In this case, for example, all NAN terminals belonging to a NAN cluster may awake at every discovery window to receive a synchronization beacon frame from a master NAN terminal. By doing so, the NAN cluster can be maintained. In this case, if all NAN terminals awake at every discovery window in a fixed manner, power consumption of the terminals may get worse. Hence, it is necessary to have a method of reducing power consumption by dynamically controlling duration of a discovery window while synchronization is maintained in a NAN cluster.

For example, as mentioned in the foregoing description, a NAN terminal may operate in 2.4 GHz band or 5 GHz band. As a different example, a NAN terminal may operate in sub 1 GHz band. For example, a NAN terminal can be configured to support IEEE 802.11ah that supports sub 1 GHz band. For example, if a NAN terminal supports 900 MHz, it may have link quality and a physical model different from link quality and a physical model in 2.4 GHz or 5 GHz.

For example, if a NAN terminal supports 900 MHz, the NAN terminal can send a signal farther and perform communication in a wider range. In this case, data communication can be performed between NAN terminals and data can be exchanged between NAN terminals. In this case, since the data exchange is performed based on the data communication, a problem may exist in efficiently managing power in the NAN terminal. In order to solve the problem, it may differently configure a method of configuring a discovery window period. FIG. 9 shows a basic structure that a synchronization beacon frame is transmitted within a discovery window and a discovery beacon frame is transmitted at the outside of the discovery window. The basic structure can also be similarly applied to a NAN terminal supporting 900 MHz band.

Figure 10:
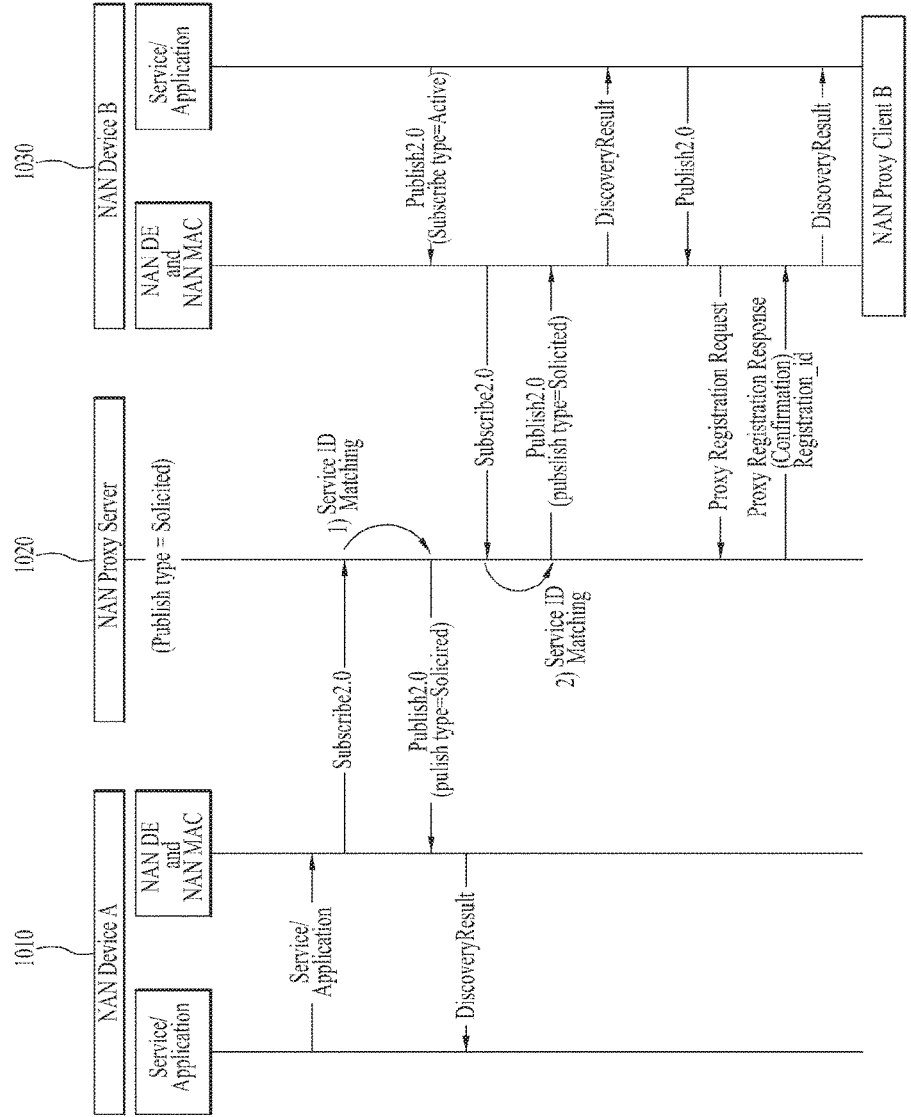
FIG. 10 is a diagram illustrating a method for a NAN terminal to register the NAN terminal at a NAN proxy server as a NAN proxy client.

FIG. 10 is a diagram illustrating a method for a NAN terminal to register the NAN terminal at a NAN proxy server as a NAN proxy client.

As mentioned in the foregoing description, NAN terminals can perform data communication. A NAN terminal can receive a frame in a manner of being awaken in a discovery window. In this case, if the NAN terminal performs a procedure for performing data communication in a manner of being awaken in all discovery windows, considerable amount of power can be consumed.

Hence, in the following, a method of reducing power consumption of a NAN terminal is explained. For example, a NAN proxy terminal can be defined as a new role (concept) of the NAN terminal. For example, the NAN proxy terminal may correspond to a NAN proxy server or a NAN proxy client. In this case, the NAN proxy server can perform a procedure for performing data communication on behalf of the NAN proxy client. For example, the NAN proxy server can perform publish and/or subscribe on behalf of the NAN proxy client. More specifically, the NAN proxy server can provide information, which is provided to perform data communication with a different NAN terminal, to other NAN terminals on behalf of the NAN proxy client. In particular, the NAN proxy server can perform the procedure for performing data communication on behalf of the NAN proxy client to reduce power consumption of the NAN proxy client.

For example, the NAN proxy server may correspond to a terminal not sensitive to power consumption. And, the NAN proxy client may correspond to a terminal operating based on low power. In this situation, similar to a legacy NAN terminal, if the NAN proxy client awakes in every discovery window, since the NAN proxy client consumes a considerable amount of power, it may be difficult to use the NAN proxy client. Hence, it may make a terminal not sensitive to power consumption perform a procedure for performing data communication on behalf of the NAN proxy client to reduce power consumption and efficiently perform the data communication.

In this case, in order for the NAN proxy server to perform the procedure for performing the data communication on behalf of the NAN proxy client, it is necessary for the NAN proxy server to obtain information on the NAN proxy client. To this end, the NAN proxy client can be registered at the NAN proxy server. In the following, a method of registering the NAN proxy client at the NAN proxy server is described.

More specifically, a NAN terminal playing a role of a proxy server may correspond to a NAN proxy server. In this case, for example, the NAN proxy server can provide other NAN terminals with information indicating that the NAN proxy server is able to operate as a NAN proxy server. For example, the NAN proxy server can include information on a NAN proxy server role in a broadcasted message. In this case, other NAN terminals can identify the NAN proxy server based on the broadcasted message. And, for example, the NAN proxy server can provide other NAN terminals with the information on the NAN proxy server role using a publish message, by which the present invention may be non-limited.

If NAN terminals 1010/1030 recognize the NAN proxy server, the NAN terminals 1010/1030 can transmit a subscribe message to the NAN proxy server 1020 to find out a service of the NAN proxy server 1020.

More specifically, as mentioned in the foregoing description, the NAN terminals 1010/1030 may have a layered structure. In this case, for example, a service/application layer of a first NAN terminal (NAN device A, 1010) can provide a discovery engine (DE) and NAN MAC of the first NAN terminal 1010 with a subscribe method.

In this case, for example, primitives of the subscribe method provided to the NAN DE and the NAN MAC layers by the service/application layer can be represented as Table 3 in the following. In particular, the service/application layer can provide information on Table 3 to the NAN DE and the NAN MAC layers. More specifically, the service/application layer can provide information on a service name, service specific information, and a configuration parameter to be searched by a NAN terminal to the NAN DE and the NAN MAC layers.

And, other additional information can also be included in the primitives of the subscribe method, by which the present invention may be non-limited.

TABLE 3

Subscribe(service_name,
service_specific_info, configuration_parameters)

service_name:
    UTF-8 name string which identifies the service/application
service_specific_info:
    Sequence of values which further specify the published service beyond the service name
configuration_parameters
    Subscribe type
        Active
    Query period
        Recommended periodicity of query transmissions
    Time to live
        The instance of the Subscribe function can be commanded to run for a given time interval or until the first DiscoveryResult event Subsequently, the first NAN terminal 1010 can transmit a subscribe message to the NAN proxy server 1020. In particular, the first NAN terminal 1010 can transmit the subscribe message to the NAN proxy server 1020 based on the subscribe method as an active subscribe.

Subsequently, when the NA proxy server 1020 replies to the subscribe message, the NAN proxy server 1020 can transmit a publish message to the first NAN terminal 1010 by matching a service ID with a service capable of being provided by the NAN proxy server 1020. In this case, a Publish Type of the publish message may correspond to Solicited.

In this case, for example, the service/application layer of the NAN proxy server 1020 can provide a publish method to the NAN DE and NAN MAC layers of the NAN proxy server 1020. In this case, for example, primitives of the publish method can be represented as follows.

In particular, the service/application layer can provide information on Table 4 to the NAN DE and the NAN MAC layers. More specifically, the service/application layer can provide information on a service name, service specific information, and a configuration parameter supported by the NAN proxy server 1020 to the NAN DE and the NAN MAC layers.

In this case, Publish type information can be included in configuration information to indicate that solicited transmission is performed. And, Solicited transmission type information can also be included in the configuration information to indicate whether or not the solicited transmission corresponds to unicast transmission or broadcast transmission. And, Time to live information can be included in the configuration information as information on time during which a publish function is performed. And, Event conditions information can be included in the configuration information to indicate whether or not an event is generated.

And, other additional information can also be included in the primitives of the publish method, by which the present invention may be non-limited.

TABLE 4

Publish( service_name,
service_specific_info, configuration_parameters )

service_name:
    UTF-8 name string which identifies the service/application
service_specific_info:
    Sequence of values which should be conveyed to the Discovery Engine of a NAN Device that has invoked a Subscribe method corresponding to this Publish method.
configuration_parameters

TABLE 4-continued

Publish( service_name,
service_specific_info, configuration_parameters )

Publish type:
        Solicited transmissions only
    Solicited transmission type:
        Determines whether a solicited transmission is a unicast or a broadcast transmission
    Time to live:
        The instance of the Publish function can be commanded to run for a given time interval or for one transmission only
    Event conditions:
        Determines when Publish related events are generated. Events can be requested to be generated on each solicited transmission. Alternatively, no events are expected.

Subsequently, if the first NAN terminal 1010 receives a publish message, the NAN DE and the NAN MAC layers of the first NAN terminal 1010 can provide a discovery result as an event to the service/application layer of the first NAN terminal 1010. By doing so, the first NAN terminal 1010 can complete the service discovery of the NAN proxy server 1020.

In this case, for example, primitives of the discovery result event can be represented as Table 5 in the following.

More specifically, the NAN DE and the NAN MAC layers can provide the service/application layer with the discovery result event including subscribe id information that identifies a subscribe function, service_specific_info information corresponding to specific service information supported by the NAN proxy server, publish_id information corresponding to publish ID information, and Address information corresponding to address information of the proxy server.

And, other additional information can also be included in the primitives of the discovery result event, by which the present invention may be non-limited.

TABLE 5

DiscoveryResult( subscribe_id,
service_specific_info, publish_id, address )

subscribe_id:
    As originally returned by the instance of the Subscribe function
service_specific_info:
    Sequence of values which were decoded from a frame received from the Proxy server
publish_id:
    Identifier for the instance of the published service on a remote Proxy server
Address:
    NAN Interface Address of the Proxy Server And, the second NAN terminal (NAN device B, 1030) can discover a service of the NAN proxy server 1020 based on a method identical to the method of the first NAN terminal 1010. In this case, for example, the service discovery on the NAN proxy server 1020 can be individually performed by each of the NAN terminals 1010/1030.

In this case, for example, having completed the service discovery on the NAN proxy server 1020, a service/application layer of the second NAN terminal 1030 can provide a publish method to NAN DE and NAN MAC layers of the second NAN terminal 1030.

In this case, for example, primitives used for the second NAN terminal 1030 to register at the NAN proxy server can be defined as Table 6 and Table 7 in the following. More specifically, the service/application layer of the second NAN terminal 1030 can provide information on proxy registration to the NAN DE and the NAN MAC layers of the second NAN terminal 1030 according to Table 6 and Table 7 as a publish method. In particular, the second NAN terminal 1030 can provide the information on the proxy registration to the NAN DE and the NAN MAC layers of the second NAN terminal 1030 by reusing a legacy publish method and a subscribe method. In this case, for example, when the legacy publish method and the subscribe method are reused, information for registering at the proxy server rather than information of the second NAN terminal for publishing the second NAN terminal 1030 can be included in a service_specific_info field. In particular, the second NAN terminal 1030 may use a method of including the information on the registration by using the legacy publish method and the subscribe method formats as it is.

TABLE 6

Publish (service_name, service_specific_info, configuration_parameters )

service_name:
    UTF-8 name string which identifies the service/application
service_specific_info:
    Sequence of values which should be conveyed to the Discovery Engine of a NAN Device that has invoked a Subscribe method corresponding to this Publish method.
configuration_parameters
    Publish type:
        Solicited transmissions only and Unsolicited transmission only
    Solicited transmission type:
        Determines whether a solicited transmission is a unicast or a broadcast transmission
    Announcement period:
        Recommended periodicity of unsolicited transmissions
    Time to live:
        The instance of the Publish function can be commanded to run for a given time interval or for one transmission only
    Event conditions:
        Determines when Publish related events are generated. Events can be requested to be generated on each solicited transmission. Alternatively, no events are expected.

TABLE 7

Subscribe ( service_name, service_specific_info, configuration_parameters )

service_name:
    UTF-8 name string which identifies the service/application
service_specific_info:
    Sequence of values which should be conveyed to the Discovery Engine of a NAN Device that has invoked a Subscribe method corresponding to this Publish method.
configuration_parameters
    Subscribe type:
        Determines the type of Subscribe as follows
            Passive: NAN NAN device can passively subscribe to
                해 주
            Active: NAN t NAN device can actively
                个 있
    Discovery range:
        Determines whether the service is searched in close proximity only or in any NAN Devices within range
        Query period:
            Recommended periodicity of query transmissions TABLE 7-continued Subscribe ( service_name, service_specific_info, configuration_parameters )

Time to live:
        The instance of the Subscribe function can be commanded to run for a given time interval or until the first DiscoveryResult eventRecommended periodicity of unsolicited transmissions As a different example, the second NAN terminal 1030 can newly define and use primitives for a method called for registration. In particular, the service/application layer of the second NAN terminal 1030 can provide information on proxy registration by providing a newly defined proxy registration method to the NAN DE and the NAN MAC layers of the second NAN terminal 1030. In this case, primitives of the newly defined proxy registration method can be represented as Table 8 in the following.

TABLE 8

ProxyRegistartion(service_name, service_specific_info, configuration_parameters)

service_name:
    UTF-8 name string which identifies the service/application
service_specific_info:
    Sequence of values which should be conveyed to the Discovery Engine of a NAN Device that has invoked a Subscribe method corresponding to this ProxyRegistration method.
configuration_parameters
    ProxyRegistration type:
        Solicited transmissions only and Unsolicited transmission
    Solicited transmission type:
        Determines whether a solicited transmission is a unicast or a broadcast transmission
    Announcement period:
        Recommended periodicity of unsolicited transmissions
    Time to live:
        The instance of the Publish function can be commanded to run for a given time interval or for one transmission only
    Event conditions:
        Determines when ProxyRegistration related events are generated. Events can be requested to be generated on each solicited transmission. Alternatively, no events are expected.

In particular, the service/application layer of the second NAN terminal 1030 can provide a method for registering at the NAN proxy server to the NAN DE and the NAN MAC. In this case, the method may correspond to a method using a legacy publish method format and the method including information on proxy registration. And, for example, the method may correspond to a method newly defined for proxy registration, by which the present invention may be non-limited.

Subsequently, the NAN DE and the NAN MAC layers of the second NAN terminal 1030 can transmit a proxy registration request to the NAN proxy server 1020. In this case, the proxy registration request may correspond to a publish message. For example, the proxy registration request may correspond to a publish type as a service discovery frame. In this case, a service discovery attribute for the proxy registration request can be represented as Table 9 in the following.

TABLE 9

| Field | Size (Octets) | Value (Hex) | Description |
|---|---|---|---|
| Attribute ID | 1 | 0x03 | Identifies the type of NAN attribute |
| Length | 2 | Variable | Length of the following fields in the attribute. |
| Service ID* | 6 | Variable | Mandatory field that contains the hash of the Service Name. |
| Instance ID | 1 | Variable | Publish_ID or Subscribe_ID |
| Requestor Instance ID | 1 | Variable | Instance ID from the frame that triggered the transmission if available, otherwise set to 0x00. |
| Service Control | 1 | Variable | Mandatory field that defines the Service Control bitmap |
| Binding Bitmap | 0 or 2 | 0x0000 to0xFFFF | Optional field that indicates the binding of the SDA to post discovery connection attributes |
| Service Response Filter Length | 0 or 1 | Variable | An optional field and present if a service response filter is used. |
| Service Response Filter | Variable | Variable | An optional field that is a sequence of length and value pairs that identify the matching service response filters |
| Service Info Length | 0 or 1 | Variable | An optional field and present if service specific information is used |
| Service Info | Variable | Variable | An optional field that contains the service specific information. Its content may be determined by the application and not specified herein. |

In this case, for example, a service ID field can be mandatorily included in fields described in the following included in the proxy registration request. In this case, the service ID field can be defined by a proxy service ID corresponding to a service provided by the NAN proxy server. And, a proxy registration request field can include information necessary for a NAN terminal to register at the NAN proxy server. In this case, for example, a service info field corresponding to a field included in the proxy registration request can include a proxy request TLV (proxy registration request TLV). In this case, the proxy request TLV can be represented as Table 10 in the following. In this case, for example, the proxy request TLV can include an availability time field indicating DW duration during which a NAN terminal awakes after being registered as a proxy client. And, the proxy request TLV can also include a service ID field corresponding to an ID of a service requested by the NAN terminal to the NAN proxy server. Besides, the proxy request TLV can also include information necessary for the NAN terminal to register at the NAN proxy server, by which the present invention may be non-limited.

TABLE 10

| Field | Size (Octets) | Value (Hex) | Description |
|---|---|---|---|
| Type | 1 | Variable | Type code of the Proxy Registration Request TLV |
| Length | 2 | Variable | Length of the Proxy Registration Request TLV (not including the Type and Length fields) |
| Availability Time | 1 | Variable | Indicates bitmap for the DW Awake Duration of Proxy Client (DW could be presented from DW0 to DW15 with bitmap pattern) If bitmap bit is set as 0, Proxy Client is sleep, otherwise bitmap bit is set as 1, Proxy Client is awake, e.g., when DW awake duration is DW1 and DW2. bitmap is presented as 011000000000000. |
| Time to live | 1 | Variable | Indicates TTL of Proxy client's service |
| Service ID | 6 | Variable | Indicates the requesting service ID |
| Instance ID | 1 | Variable | Publish_ID or Subscribe_ID |
| Requestor Instance ID | 1 | Variable | Instance ID from the frame that triggered the transmission if available, otherwise set to 0x00 |
| Service Control | 1 | Variable | Mandatory field that defines the Service Control bitmap |
| Binding Bitmap | 0 or 2 | 0x0000 to0xFFFF | Optional field that indicates the binding of the SDA to post discovery connection attributes |
| Service Response Filter Length | 0 or 1 | Variable | An optional field and present if a service response filter is used |

TABLE 10-continued

| Field | Size (Octets) | Value (Hex) | Description |
|---|---|---|---|
| Service Response Filter | Variable | Variable | An optional field that is a sequence of length and value pairs that identify the matching service response filters |
| Service Info Length | 0 or 1 | Variable | An optional field and present if service specific information is used |
| Service Info | Variable | Variable | An optional field that contains the service specific information. Its content may be determined by the application and not specified herein. |

Subsequently, the NAN proxy server can transmit a proxy response to the second NAN terminal 1030 in response to the proxy request. In this case, for example, the proxy response may correspond to a publish message. For example, the proxy registration response corresponds to a service discovery frame having a publish type. In this case, for example, a service discovery attribute for the proxy registration response can be represented as the aforementioned Table 9.

In this case, for example, a service ID field may correspond to a field mandatorily included in the fields described in the following included in the proxy registration response. In this case, the service ID field can be defined by a proxy service ID corresponding to a service provided by the NAN proxy server. The proxy registration response field can also include information necessary for a NAN terminal to register at the NAN proxy server. In this case, a service info field corresponding to a field included in the proxy registration response can include a proxy response TLV (proxy registration response TLV). In this case, the proxy response TLV can be represented as Table 11 in the following. In this case, for example, the proxy response TLV can include a status indication field indicating whether or not the NAN proxy server permits the registration of a NAN terminal. In this case, for example, if the status indication field corresponds to 0, it may indicate that the NAN proxy server permits the registration of the NAN terminal. And, if the status indication field corresponds to 1 or 2, it may indicate that the registration is denied base on a different reason. And, for example, the proxy response TLV can include a registration ID field indicating a registration ID. And, the proxy response TLV can include a service ID field corresponding to an ID of a service provided by the NAN proxy server. Besides, the NAN proxy response TLV can include information necessary for a NAN terminal to register at the NAN proxy server, by which the present invention may be non-limited.

TABLE 11

| Field | Size (Octets) | Value (Hex) | Description |
|---|---|---|---|
| Type | 1 | Variable | Type code of the Proxy Registration Response TLV |
| Length | 2 | Variable | Length of the Proxy Registration Response TLV (not including the Type and Length fields) |
| Status indication | 1 | Variable | If set to 0, Proxy registration is accept, otherwise set to 1 is fail due to requested information not available, and set to 2 is fail due to bad request |

TABLE 11-continued

| Field | Size (Octets) | Value (Hex) | Description |
|---|---|---|---|
| Registration ID | 1 | Variable | Indicates the Registration ID of requested service |
| MAC Address of matched device | 6 | Variable | Indicates the MAC Address of service matched device on a remote NAN Device |
| Service ID | 6 | Variable | Responses the requesting service ID |
| Time to live | 1 | Variable | Indicates TTL of Proxy Server |
| Watchdog timer | 1 | Variable | Indicates Watchdog timer value |

Subsequently, if the NAN DE and the NAN MAC of the second NAN terminal 1030 receive a confirmation from the NAN proxy server, the NAN DE and the NAN MAC of the second NAN terminal 1030 can provide a discovery result event to the service/application layer. In this case, for example, if a proxy response of which the status indication field corresponds to 1 is received, it may indicate that a confirmation is completed. Subsequently, the second NAN terminal 1030 may become a NAN proxy client registered at the NAN proxy server based on the discovery result event.

A NAN terminal may become a NAN proxy client registered at the NAN proxy server via the aforementioned procedure.

As mentioned in the foregoing description, it may be able to support a mechanism for performing data transmission of NAN terminals or reducing power consumption using the NAN proxy server. In this case, for example, when two NAN terminals are unable to perform communication due to a distance between the two NAN terminals, the terminals can perform communication using the NAN proxy server. And, since it is not necessary for a NAN proxy client to awake in every discovery window, it may be able to reduce power consumption.

In this case, the NAN terminal can perform a service discovery of the NAN proxy server by transmitting a subscribe message to the NAN proxy server. In this case, in order for the NAN terminal to transmit the subscribe message to the NAN proxy server, it is necessary to identify the NAN proxy server. In particular, it is necessary for the NAN terminal to check the existence of the NAN proxy server.

In this case, for example, the NAN proxy server can inform the NAN terminal of the existence of the NAN proxy server by publishing a service discovery frame by broadcasting the service discovery frame. In this case, for example, the publishing may correspond to a solicited type or an unsolicited type, by which the present invention may be non-limited.

For example, in order for the NAN proxy server to inform the NAN terminal of the capability of the NAN proxy server, the NAN proxy server can add a proxy server attribute within a NAN beacon frame or a service discovery frame. In this case, among NAN terminals, which have received the NAN beacon frame or the service discovery frame including the proxy server attribute, a terminal supporting a proxy client function interprets the proxy server attribute and may be then able to check the existence of the proxy server located near the terminal.

More specifically, Table 12 shows NAN attribute information capable of being included in the beacon frame and the service discovery frame. In this case, in Table 12, an attribute ID field can be defined by a different value to indicate a different attribute. And, for example, each of the attribute information may or may not be included in the beacon frame and the service discovery frame. And, for example, specific attribute information among the attribute information can be mandatorily included (represented by "M" in the table) in the beacon frame and the service discovery frame or can be optionally included (represented by "O" in the table) in the beacon frame and the service discovery frame.

In this case, it may be able to define at least one of a proxy server attribute field and a proxy client attribute field using a reserved bit belonging to the fields of the NAN attribute information. In this case, for example, the proxy server attribute field can be included in at least one selected from the group consisting of a NAN synchronization beacon frame, a NAN discovery beacon frame, and a NAN service discovery frame. In particular, the proxy server attribute field corresponds to a field defined by the NAN proxy server to notify the existence of the NAN proxy server. The proxy server attribute field can be selectively included in each of the frames.

On the contrary, the proxy client attribute field can be selectively included in the service discovery frame. In particular, the proxy client attribute field may correspond to information transmitted by a NAN terminal based on whether or not the NAN proxy server exists and whether or not the NAN terminal becomes a NAN proxy client. Hence, the proxy client attribute field is not transmitted to a NAN beacon frame and can be transmitted in a manner of being included in a NAN service discovery window.

TABLE 12

| Attribute ID | Description | NAN Beacons Sync | Discovery | NAN SDF |
|---|---|---|---|---|
| 0 | Master Indication Attribute | YES/M | YES/M | NO |
| 1 | Cluster Attribute | YES/M | YES/M | NO |
| 2 | Service ID List Attribute | YES/O | YES/O | NO |
| 3 | Service Descriptor Attribute | NO | NO | YES/M |
| 4 | NAN Connection Capability Attribute | NO | NO | YES/O |
| 5 | WLAN Infrastructure Attribute | NO | NO | YES/O |
| 6 | P2P Operation Attribute | NO | NO | YES/O |
| 7 | IBSS Attribute | NO | NO | YES/O |
| 8 | Mesh Attribute | NO | NO | YES/O |
| 9 | Further NAN Service Discovery Attribute | NO | NO | YES/O |
| 10 | Further Availability Map Attribute | NO | NO | YES/O |
| 11 | Country Code Attribute | YES/O | YES/O | YES/O |
| 12 | Ranging Attribute | NO | NO | YES/O |
| 13 | Cluster Discovery Attribute | NO | NO | NO |
| 14(TBD) | Proxy Server Attribute | YES/O | YES/O | YES/O |
| 15(TBD) | Proxy Client Attribute | NO | NO | YES/O |
| 16-220 | Reserved | NA | NA | NA |
| 221 | Vendor Specific Attribute | YES/O | YES/O | YES/O |
| 222-255 | Reserved | NA | NA | NA |

In this case, the proxy server attribute field can be configured as Table 13 in the following. More specifically, the proxy server attribute field can include a proxy server address field including address information of a NAN interface of a proxy server. And, the proxy server attribute field can include a proxy server capability field as information on capability of the NAN proxy server. In this case, a function of the NAN proxy server can be included in a bitmap form. And, an awake interval of the NAN proxy server can be represented by a value of an integer form. In this case, the integer value corresponds to a discovery window period during which the NAN proxy server is awaked. In particular, if the integer value corresponds to 1, the NAN proxy server can awake in every discovery window period. In this case, for example, since the NAN proxy server plays a role of the NAN proxy client on behalf of the NAN proxy client, it is preferable that the NAN proxy server awakes in every discovery window.

And, for example, if it is necessary to reduce power consumption of the NAN proxy server, it may change the integer value, by which the present invention may be non-limited. If the NAN proxy server provides a function of an AP STA at the same time, it may include a BSSID field as the AP STA.

TABLE 13

| Field | Size (octets) | Value | Description |
|---|---|---|---|
| Attribute ID | 1 | 0x14 | Identifies the type of NAN attribute, (TBD) |
| Length | 2 | Variable | Length of the following fields in the attribute. |
| Proxy Server Address | 6 | Variable | NAN Interface address of NAN Proxy Server |
| Proxy Server Capability | 1 | Variable | Capability of Proxy Server |
| Awake interval | 1 | 1-255 | DW interval of this Proxy Server |
| BSSID | 6 | Variable | BSSID which is support by Proxy Service if capable. |

And, a bitmap for the proxy server capability field can be represented as Table 14 in the following. More specifically, a publish proxy bit of the proxy server capability bitmap can indicate whether or not the NAN proxy server is able to transmit a service publish, which is proxied by receiving a publish request from a neighboring NAN terminal.

And, a subscribe proxy bit can indicate whether or not the NAN proxy server searches for a neighboring service by receiving a subscribe request from a neighboring NAN terminal and whether or not the NAN proxy server informs a NAN terminal of the searched service. And, a follow-up proxy bit can indicate whether or not a function of proxying a follow-up service discovery window of a neighboring NAN terminal is available. And, an invite proxy bit indicates whether or not a function of asking neighboring NAN terminals to participate in BSS of an AP STA of the NAN proxy server is available. And, a NAN data path can indicate whether or not the NAN proxy server supports a NAN data path function. And, a NAN data forwarding bit can indicate whether or not a function of receiving a NAN data path from a NAN terminal and forwarding the NAN data path to neighboring NAN terminals is available. In particular, the proxy server capability field can indicate information on the functions capable of being performed by the NAN proxy server, by which the present invention may be non-limited.

TABLE 14

| Bit(s) | Information | Notes |
| --- | --- | --- |
| 0 | Publish Proxy | Publish Proxy bit shall be set, if a Proxy server supports proxy a Publish request form Proxy client, and is set to 0 otherwise. |
| 1 | Subscribe Proxy | Subscribe Proxy bit shall be set, if a Proxy server supports proxy a Subscribe request form Proxy client, and is set to 0 otherwise. |
| 2 | Follow-up Proxy | Follow-up Proxy bit shall be set, if a Proxy server supports proxy a Follow-up request form Proxy client, and is set to 0 otherwise. |
| 3 | Invite Proxy | Follow-up Proxy bit shall be set, if a Proxy server supports to invite other NAN device to its own BSS, and is set to 0 otherwise. |
| 4 | NAN Data Path | NAN Data Path bit shall be set, if a Proxy server supports NAN data path capability, and is set to 0 otherwise. |
| 5 | NAN Data Forwarding | NAN Data Forwarding bit shall be set, if a Proxy server supports NAN data forwarding from a NAN device to other, and is set to 0 otherwise |
| 6-7 | Reserved | — |

As another example, a follow-up message for a proxy service may be defined. In this case, for example, the follow-up message may be the aforementioned publish message. That is, the follow-up message may be a message exchanged for a proxy service by an NAN proxy server and an NAN proxy client.

In this case, the follow-up message may be a form of a service discovery frame. A service discovery attribute of the service discovery frame may be represented in Table 9 above. For example, a Service Info field of the service discovery attribute field may include a TLV field as information of a proxy service.

For example, the Service Info field may include any one of TLV fields such as a Proxy Registration Request TLV field, a Proxy Registration Response TLV field, a Proxy Registration Update Request TLV field, a Proxy Registration Update Response TLV field, a Proxy Deregistration Request TLV field, a Proxy Deregistration Response TLV field, a Proxy Discovery Result Request TLV field, and a Proxy Discovery Result Response TLV field.

That is, the Service Info field may include information items on a proxy service as a TLV field. In this case, for example, the Proxy Registration Request TLV field may be represented in Table 10 above. The Proxy Registration Response TLV field may be represented in Table 11 above. That is, the Proxy Registration Request TLV field and the Proxy Registration Response TLV field may be used to perform a registration procedure on the NAN proxy server, as described above.

For example, a Status Indication field of the Proxy Registration Response TLV field of Table 11 above may be represented in Table 15 below. That is, the Status Indication field may include response information items to a proxy registration request.

TABLE 15

| Value | Description |
| --- | --- |
| 0 | Success |
| 1 | Requested information not available |
| 2 | Bad request |
| 3-255 | Reserved |

For example, the Proxy Deregistration Request TLV field and the Proxy Deregistration Response TLV field as a TLV field defined in the Service Info field may be represented in Tables 16 and 17 below. In this case, the Proxy Deregistration Request TLV field may include at least one field of a Deregistration Request ID, a Proxy Device ID, a Proxy Device Role, or a Service ID field as information for deregistration in the NAN proxy server.

For example, the Proxy Deregistration Response TLV field may include information for checking whether deregistration is performed in the NAN proxy server. For example, the Proxy Deregistration Response TLV field may include at least one field of a Type, a Proxy Device ID, or Confirmation field.

TABLE 16

| Field | Size (Octets) | Value (Hex) | Description |
| --- | --- | --- | --- |
| Length | 2 | Variable | Length of the Service info |
| Deregistration Request ID | 1 | Variable | Deregistration Request ID is a nonzero value used to match the Proxy Deregistration Request TLVs |
| Proxy Device ID | 1 | Variable | Indicates the Device ID of Proxy |
| Proxy Device Role | 1 | Variable | Indicates the Proxy Device Role If set to 0, Proxy Device Role is Proxy Server, otherwise set to 1 it means Proxy Client |
| Service ID | 1 | Variable | Service ID to release the service |

TABLE 17

| Field | Size (Octets) | Value (Hex) | Description |
| --- | --- | --- | --- |
| Length | 2 | Variable | Length of the Service info |
| Type | 1 | Variable | Indicates the type |
| Proxy Device ID | 1 | Variable | Indicates the Proxy Server ID |
| Confirmation | 1 | Variable | Indicates the confirmation of the release |

For example, the Proxy Discovery Result Request TLV field and the Proxy Discovery Result Response TLV field as a TLV field defined in Service Info may be represented in Tables 18 and 19 below. That is, these fields may include information on a proxy discovery result. For example, the Proxy Discovery Result Request TLV field may include at least one field of a Type, a Device ID, or a Requesting Service ID field. The Proxy Discovery Result Response TLV field may include at least one field of a Type, a Proxy Device ID, or a Requested Service Info field. Thereby, a proxy discovery procedure for a proxy service may be performed.

TABLE 18

| Field | Size (Octets) | Value (Hex) | Description |
| --- | --- | --- | --- |
| Length | 2 | Variable | Length of the Service info |
| Type | 1 | Variable | Indicates the type |
| Device ID | 1 | Variable | Indicates the NAN Device ID to request proxy client list |
| Requesting Service ID | 6*N | Variable | List of requesting service IDs |

TABLE 19

| Field | Size (Octets) | Value (Hex) | Description |
|---|---|---|---|
| Length | 2 | Variable | Length of the Service info |
| Type | 1 | Variable | Indicates the type |
| Proxy Device ID | 1 | Variable | Indicates the Proxy Server ID |
| Requested Service info | 8 * N | Variable | List of requested Service info 8: 1 (Registered Proxy Client ID) plus 6 (Service ID) plus 1 (Awake Duration of Proxy Client) |

For example, the Proxy Registration Update Request TLV field and the Proxy Registration Update Response TLV field may be defined as a TLV field defined in Service Info and may be represented in Tables 20 and 21 below. That is, the TLV field may include update information indicating whether registration is performed on the NAN proxy server. In this case, for example, the Proxy Registration Update Request TLV field may include at least one field of a Type, a Length, a Registration ID, a Proxy Server MAC address, a Service ID, an Availability Time, or Time to live of Registered Service field.

The Proxy Registration Update Response TLV field may include at least one field of a Type, a Length, a Registration ID, a Proxy Server MAC address, or a Status Indication field.

TABLE 20

| Field | Size (Octets) | Value (Hex) | Description |
|---|---|---|---|
| Type | 1 | Variable | Type code of the Proxy Registration Update Request TLV |
| Length | 2 | Variable | Length of the Proxy Registration Update Request TLV (not including the Type and Length fields) |
| Registration ID | 1 | Variable | Indicates the Registration ID of requested service |
| Proxy Server MAC address | 6 | Variable | Indicates the MAC Address of Proxy Server |
| Service ID | 6 | Variable | Indicates the requesting service ID |
| Availability Time | 1 | Variable | Indicates bitmap for the DW Awake Duration of Proxy Client (DW could be presented from DW0 to DW15) |
| Time to live of registered service | 1 | Variable | Indicates TTL of registered service |

TABLE 21

| Field | Size (Octets) | Value (Hex) | Description |
|---|---|---|---|
| Type | 1 | Variable | Type code of the Proxy Registration Update Response TLV |
| Length | 2 | Variable | Length of the Proxy Registration Update Response TLV (not including the Type and Length fields) |
| Registration ID | 1 | Variable | Indicates the Registration ID of requested service |
| Proxy Server MAC address | 6 | Variable | Indicates the MAC Address of service matched device on a remote NAN Device |
| Status indication | 1 | Variable | Indicates the update status. If status is changed, status indication is set as 1 as update, otherwise status indication is set as 0 |

A service discovery attribute field may be defined in the form of a service discovery frame in the follow-up message. In this case, for example, a field of the service discovery attribute may include a TLV field as information on a proxy service, as described above.

FIGS. 11 to 14 are diagrams illustrating a method of performing discovery according to each type.

As mentioned in the foregoing description, a NAN proxy server can perform a procedure for performing communication on behalf of a NAN proxy client after the NAN proxy client registers at the NAN proxy server. In this case, for example, it may perform discovery on an operation performed between the NAN proxy server and a different NAN terminal based on publish/subscribe. And, it may also perform discovery on the operation performed between the NAN proxy server and the different NAN terminal based on passive/active. In this case, a method of performing the discovery in consideration of each status is explained in the following.

Figure 11:
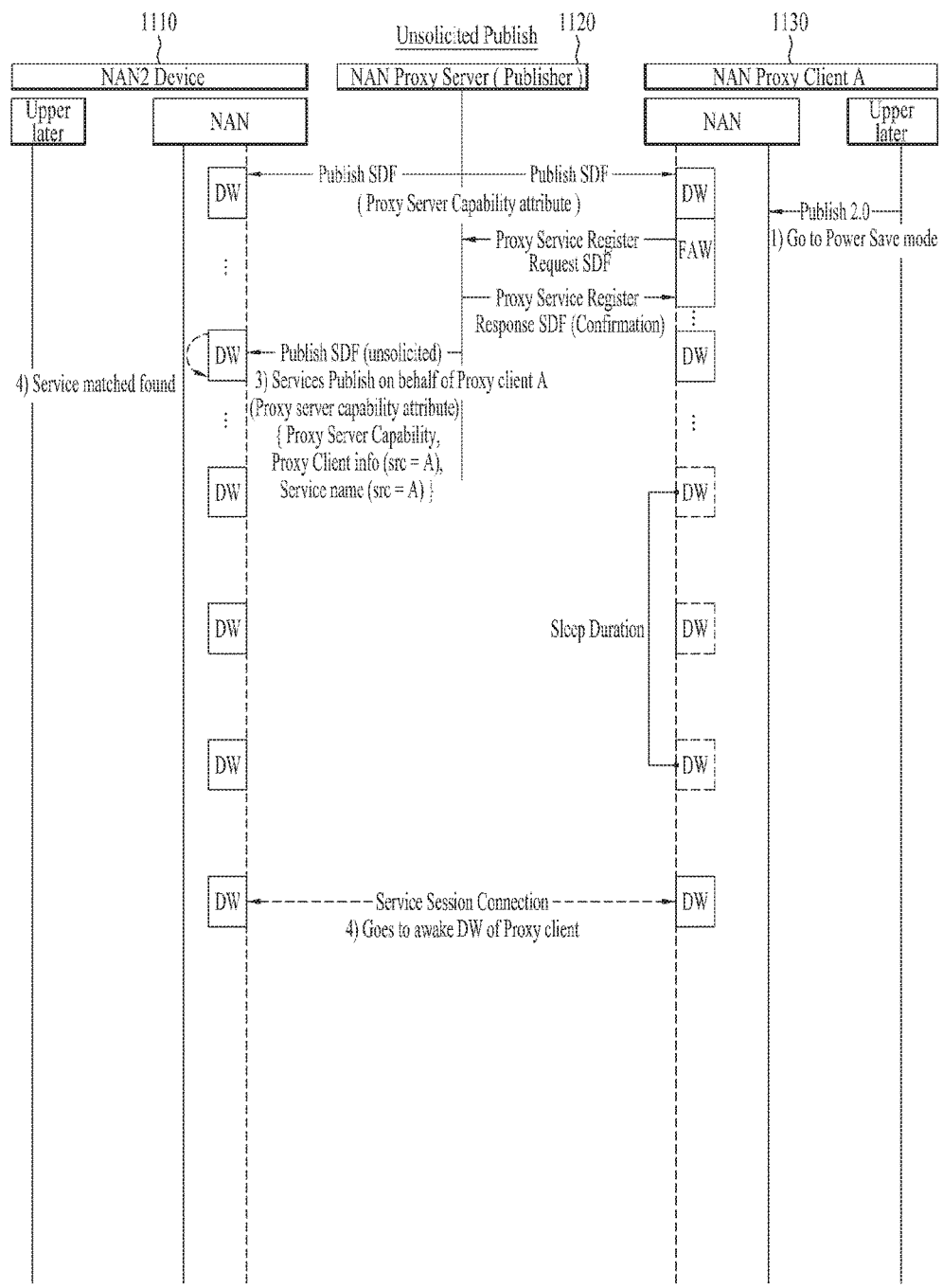
FIG. 11 is a diagram illustrating a method of performing discovery based on unsolicited publish type.

FIG. 11 is a diagram illustrating a method of performing discovery based on unsolicited publish type. As mentioned in the foregoing description, a NAN proxy client 1130 can be registered at a NAN proxy server 1120. In this case, the NAN proxy server 1120 can periodically publish a service discovery frame. In this case, a publish type may correspond to an unsolicited type. In particular, a different NAN terminal 1110 may not send a separate response after a published service discovery frame is received. And, information on the registered NAN proxy client 1130 can be included in the service discovery frame. Subsequently, having received the service discovery frame, the NAN terminal 1110 can check whether or not a service of the NAN proxy client 1130 included in the service discovery frame corresponds to a service preferred by the NAN terminal 1110. In this case, for example, the NAN terminal 1110 can directly perform service matching based on information on the service included in the service discovery frame. By doing so, the NAN terminal 1110 can check whether or not a service corresponds to a service preferred by the NAN terminal 1110. Subsequently, when the NAN terminal 1110 performs communication with the NAN proxy client 1130, the NAN terminal 1110 can establish a session with the NAN proxy client to perform direct communication with the NAN proxy client 1130.

In this case, for example, the NAN terminal 1110 can obtain information on a discovery window period during which the NAN proxy client 1130 is awaked via a service discovery frame. In this case, the NAN terminal 1110 awakes in the discovery window in which the NAN proxy client 1130 is awaked and can establish a direct session with the NAN proxy client 1130. In particular, according to the unsolicited publish type, the NAN terminal 1110 can establish a session with the NAN proxy client 1130 via direct service matching without a separate response after a service discovery frame is received from the NAN proxy server 1120.

Figure 12:
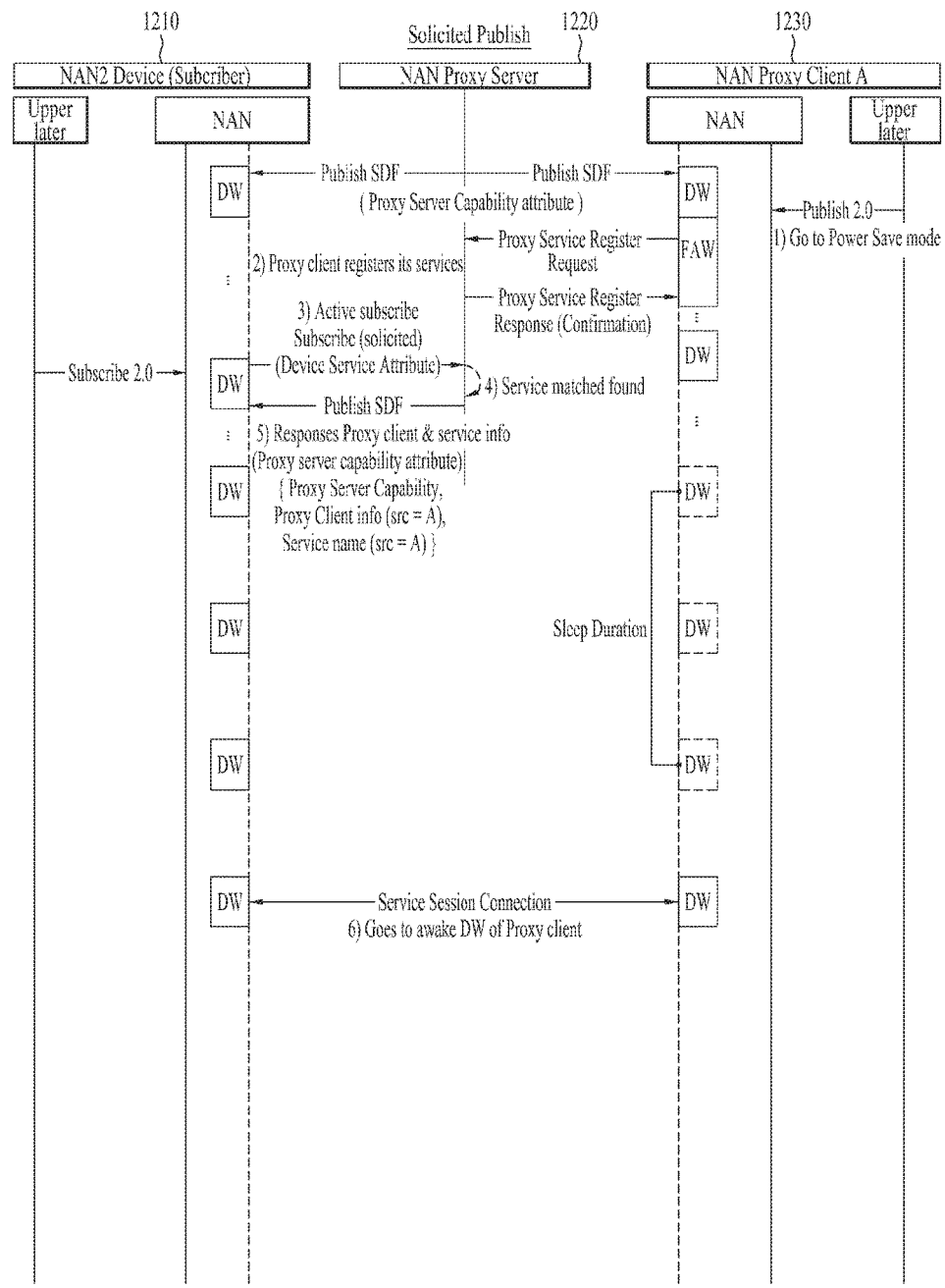
FIG. 12 is a diagram illustrating a method of performing discovery based on solicited publish type.

FIG. 12 is a diagram illustrating a method of performing discovery based on solicited publish type. When a NAN terminal 1210 intends to search for a NAN proxy client 1230 having a service preferred by the NAN terminal, the NAN terminal 1210 can actively subscribe to a NAN proxy server 1220. In this case, a subscribe type may correspond to a solicited type. In particular, the NAN terminal 1210 can transmit a subscribe message to the NAN proxy server 1220. In this case, for example, the subscribe message can include device service attribute information corresponding to information on the service preferred by the NAN terminal 1210. In this case, for example, the device service attribute information can be represented as Table 22 in the following.

TABLE 22

| Device Service Attribute |
| --- |
| Attribute ID |
| Device ID |
| Instance ID |
| MAC interface |
| Publish mode |
| Subscribe mode |
| Service info |

Subsequently, the NAN proxy server 1220 can determine whether or not information of the registered NAN proxy client 1230 is identical to the service included in the subscribe message. In this case, if the information of the registered NAN proxy client 1230 is identical to the service included in the subscribe message, the NAN proxy server 1220 can publish a service discovery frame again. In this case, for example, service descriptor attribute information and NAN connection capability attribute information can be additionally included in the service discovery frame. In particular, additional information can be included in the service discovery frame to make the NAN terminal 1210 establish a session with the registered NAN proxy client 1230. Subsequently, the NAN terminal 1210 awakes in a discovery window in which the NAN proxy client 1230 is awaked to establish a direct session with the NAN proxy client 1230. In particular, according to the solicited publish type, the NAN terminal 1210 transmits a subscribe message of a solicited type to the NAN proxy server 1220, receives a response from the NAN proxy server 1220, and establish a session with the NAN proxy client 1230.

Figure 13:
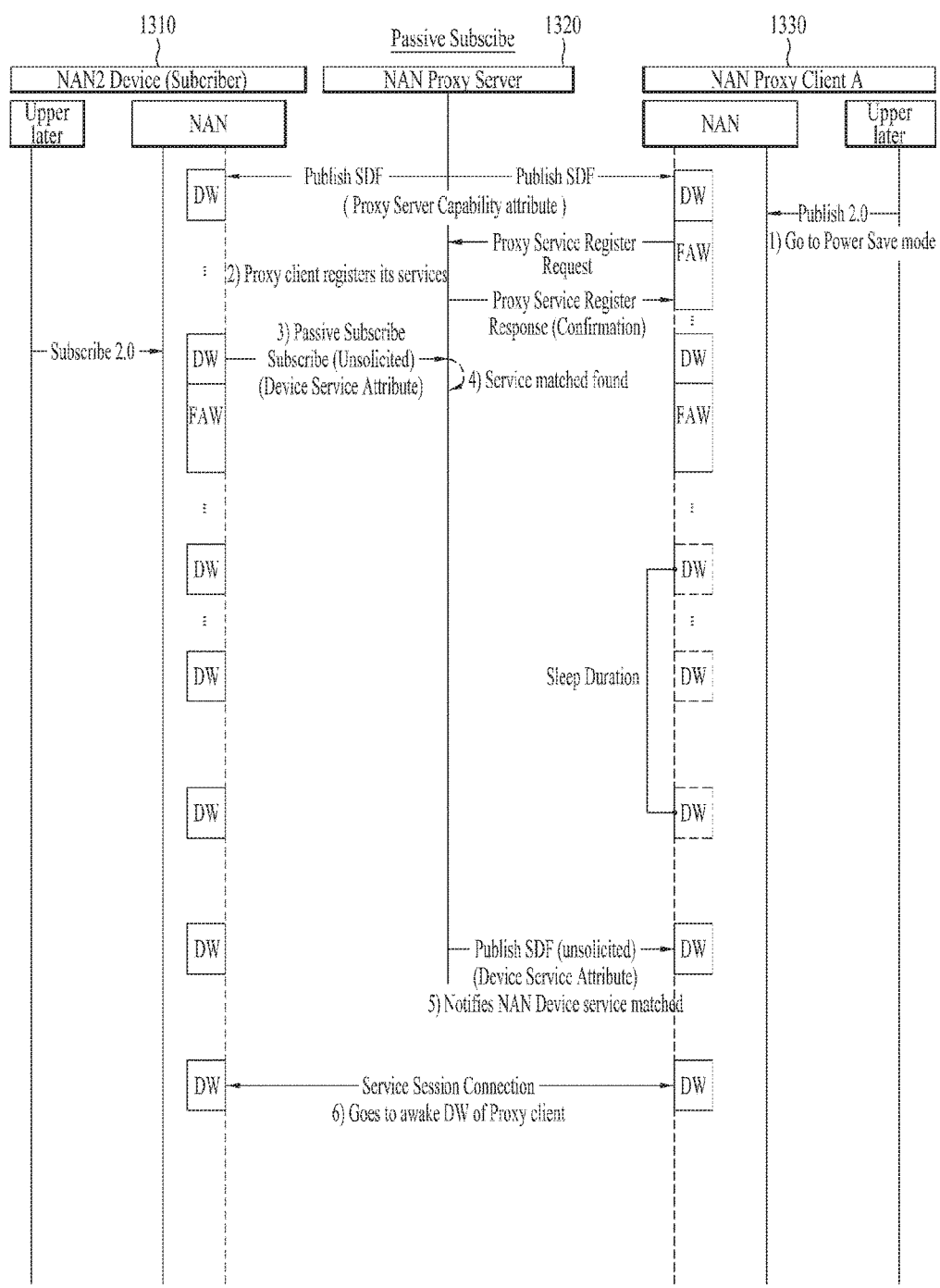
FIG. 13 is a diagram illustrating a method of performing discovery based on a passive subscribe type on the basis of a NAN proxy server.

FIG. 13 is a diagram illustrating a method of performing discovery based on a passive subscribe type on the basis of a NAN proxy server. When a NAN terminal 1310 intends to search for a NAN proxy client 1330 having a service preferred by the NAN terminal, the NAN terminal 1310 can actively subscribe to a NAN proxy server 1320. In this case, a subscribe type may correspond to an unsolicited type. In particular, the NAN terminal 1310 can transmit a subscribe message to the NAN proxy server 1320. In this case, for example, the subscribe message can include device service attribute information corresponding to information on the service preferred by the NAN terminal 1310. In this case, for example, the device service attribute information can be represented as Table 22 mentioned above. In this case, since the subscribe type corresponds to the unsolicited type, the NAN proxy server 1320 may not publish a separate service discovery frame to the NAN terminal 1310. In this case, for example, the NAN proxy server 1320 can wait for a discovery window in which the NAN proxy client 1330 is awaked. Subsequently, the NAN proxy server 1320 can transmit a service discovery frame to the NAN proxy client 1330 in the discovery window in which the NAN proxy client 1330 is awaked by publishing the service discovery frame. In this case, the publish type may correspond to an unsolicited type. In this case, device service attribute information received from the NAN terminal 1310 can be included in the service discovery frame. In this case, for example, if the NAN proxy client 1330 receives a publish message, the NAN proxy client 1330 can awake in every discovery window. Subsequently, the NAN proxy client 1330 can establish a session with the NAN terminal 1310.

In particular, according to the passive subscribe type, the NAN proxy server 1320 receives information on a service from the NAN terminal 1310, delivers the information to the NAN proxy client 1330, and establishes a session with the NAN terminal 1310 and the NAN proxy client 1330.

Figure 14:
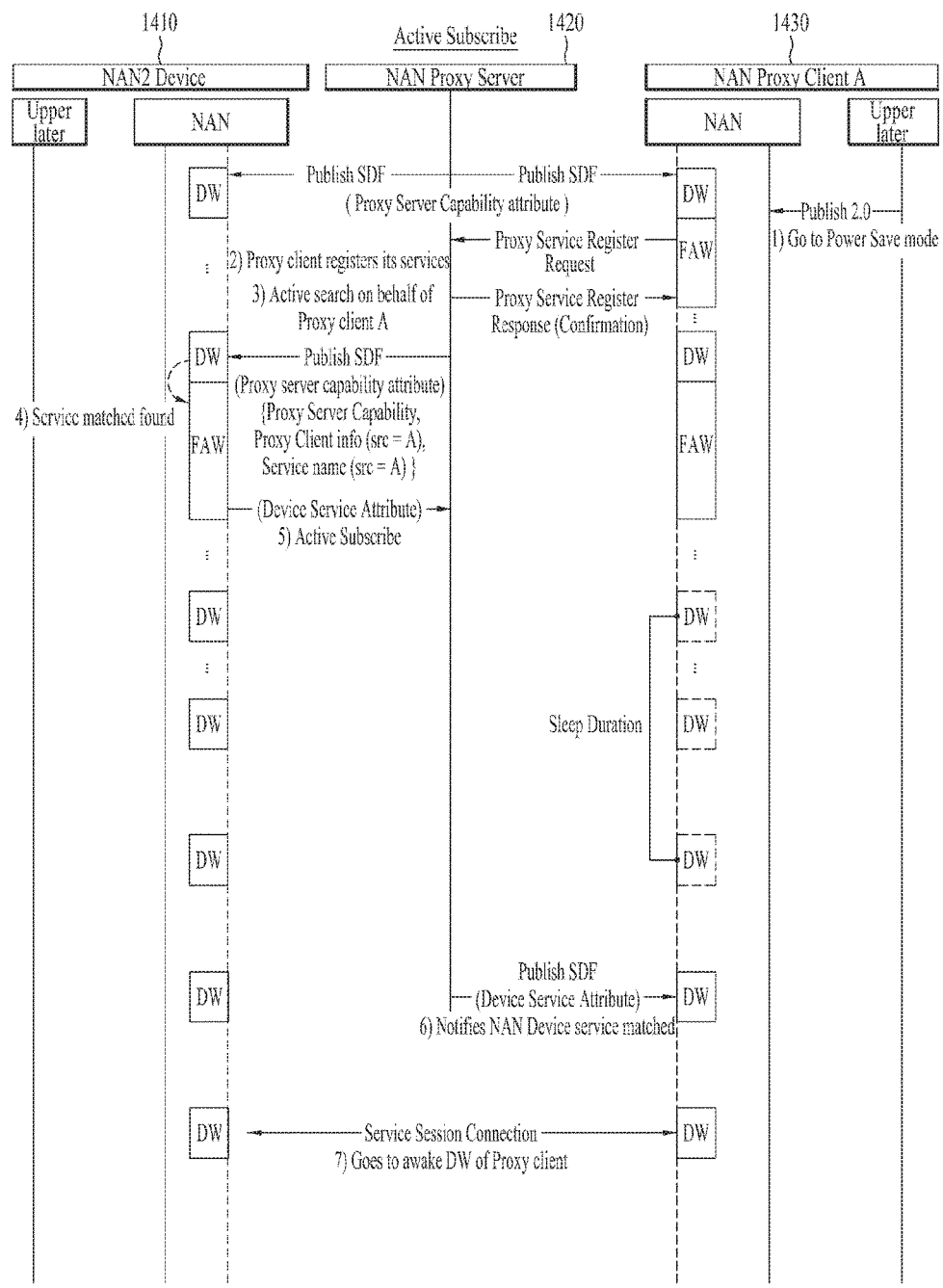
FIG. 14 is a diagram illustrating a method of performing discovery based on an active subscribe type on the basis of a NAN proxy server.

FIG. 14 is a diagram illustrating a method of performing discovery based on an active subscribe type on the basis of a NAN proxy server.

A NAN proxy server 1420 can publish a service discovery frame to a NAN terminal 1410 on behalf of a NAN proxy client 1410. In this case, information on the NAN proxy client 1430 can be included in a publish message. Subsequently, the NAN proxy server 1420 can receive a subscribe message including device service attribute information from the NAN terminal. In this case, the device service attribute information can be represented as Table 19 mentioned above. Subsequently, the NAN proxy server 1420 can publish a service discovery frame to the NAN proxy client 1430. Subsequently, the NAN proxy client 1430 can establish a session with the NAN terminal 1410. In particular, according to the active subscribe type, on behalf of the NAN proxy client 1430, the NAN proxy server 1420 provides information on a service to the NAN terminal 1410 and receives a response from the NAN terminal 1410. Subsequently, as mentioned in the foregoing description, the NAN proxy server 1420 can deliver information received from the NAN terminal 1410 to the NAN proxy client 1430.

Figure 15:
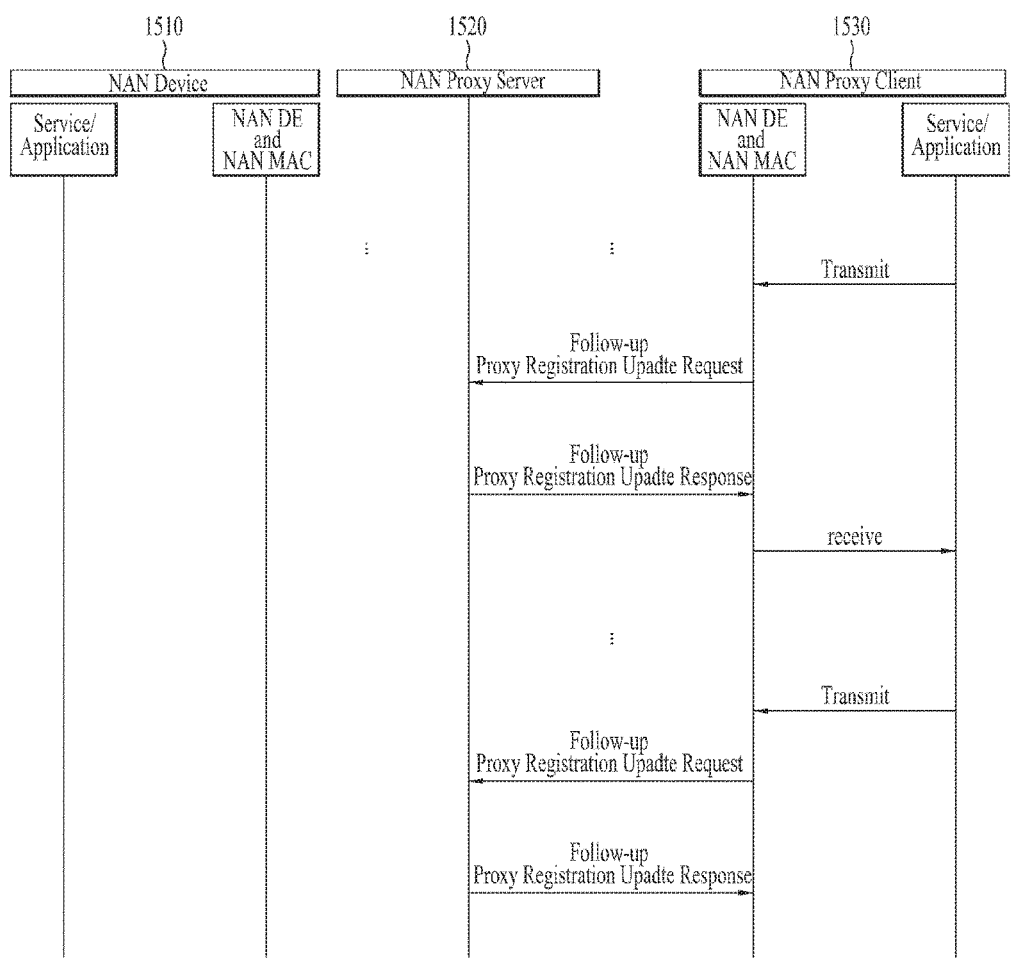
FIG. 15 is a diagram showing a method of updating a proxy service.

FIG. 15 is a diagram showing a method of updating a proxy service.

An NAN proxy client may be registered in an NAN proxy server. The NAN proxy server may provide a proxy client proxy service instead of an NAN proxy client. In this case, as described above, the NAN proxy server may receive information on Time to live (hereinafter, TTL) during a procedure in which the NAN proxy client is registered. The NAN proxy server may provide a proxy service based on TTL information instead of the NAN proxy client. In this case, the TTL may be predetermined time information and, in this regard, the NAN proxy server may not provide the proxy service instead of the NAN proxy client after a time period corresponding to a TTL value elapses. Accordingly, the NAN proxy client may perform update before a time period corresponding to a TTL value elapses.

In more detail, referring to FIG. 15, when an NAN proxy server 1520 begins to provide a proxy service instead of an NAN proxy client 1530, a TTL of a proxy service may be counted. In this case, the TTL of the proxy service may be provided for a time corresponding to a TTL value.

In this case, to continuously maintain a proxy service, a service/application end of the NAN proxy client 1530 may call a Transmit method to NAN DE and NAN MAC ends. For example, Primitive of the Transmit method may be represented in Table 23 below. In this case, the Primitive of the Transmit method may include an effective publish ID restored by a publish function or a subscribe function or Handle information including subscribe ID information. In addition, the Primitive of the Transmit method may include Service Specific Info as Service Info included in a transmitted frame body. In addition, the Primitive of the Transmit method may include an NAN Interface Address, Requestor Instance ID, Priority information, and the like as configuration parameter information. In addition, the Primitive of the Transmit method may include Registration ID information, Proxy Server MAC address information, and the like. That is, the Primitive of the Transmit method may include proxy service related information. For example, the Primitive of the Transmit method may include information on proxy service update and is not limited to the aforementioned embodiment.

TABLE 23

Transmit( handle, service_specific_info, configuration_parameters, registration_ID, proxy_server_mac_addr)

Handle: A valid publish_id or subscribe_id which has been originally returned by an instance of the Publish function or the Subscribe function respectively
service_specific_info: Sequence of values which are to be transmitted in the frame body
configuration_parameters
    NAN Interface Address: MAC address of the NAN Device to which the frame is destined to
    Requestor Instance ID: Identifier of the instance of the Publish function or the Subscribe function in the NAN Device to which the follow-up message is destined to
    Priority: Requested relative priority of the transmissions
Registration_ID: ID value received from Proxy server during registration of first service
proxy_server_mac_addr: MAC (NAN interface) address of Proxy server After receiving call of the Transmit method, the NAN DE and NAN MAC of the NAN proxy client 1530 may transmit a Proxy Registration Update Request to the NAN proxy server 1520. For example, the Proxy Registration Update Request may be a follow-up message. The Proxy Registration Update Request may include the aforementioned Proxy Registration Update Request TLV field information in the form of service discovery frame. That is, after maintaining a sleep state for a predetermined time period after a registration procedure and, then, receiving call of the transmit method, the NAN proxy client 1530 may transmit the Proxy Registration Update Request to the NAN proxy server 1520. In this case, for example, the Proxy Registration Update Request may include update or changed information as Service Info of proxy registration. That is, the NAN proxy client 1530 may transmit information changed while a sleep state is maintained, in the Proxy Registration Update Request.

In this case, the NAN proxy server 1520 may update the changed information based on the Service Info included in the Proxy Registration Update Request. As described above, the Proxy Registration Update Request may include Time to live of registered service information. In this case, when the NAN proxy server receives the Proxy Registration Update Request, a TTL value may be updated based on the aforementioned Time to live of registered service information. That is, the proxy server 1520 may reset counting of the TTL of the proxy service. In this case, for example, the TTL of the proxy service may be counted based on a counting watchdog timer. That is, the watchdog timer of the NAN proxy server 1520 may be reset based on the Proxy Registration Update Request.

Then, the NAN proxy server 1520 may provide a response to the changed service to the NAN proxy client 1530 through the Proxy Registration Update Response. In this case, for example, as described above, the Proxy Registration Update Response may be a follow-up message and may be a service discovery frame form. In this case, the Proxy Registration Update Response may include a proxy registration update TLV field. In this case, the Status Indication of the proxy registration update TLV field may indicate whether information on a proxy service is updated. Thereby, the NAN proxy client 1530 may check whether the proxy service is updated.

In this case, when the NAN proxy client 1530 receives the proxy Registration Update Response, the NAN DE and NAN MAC end of the NAN proxy client 1530 may call a receive event to a service/application end of the NAN proxy client 1530. For example, Primitive of the receive event may be represented in Table 24 below. In this case, the Primitive of the receive event may include an original publish ID or an ID indicating subscribe ID information. The Primitive of the receive event may include Peer Instance ID information for identification of an NAN device that receives a follow-up message. In addition, the Primitive of the receive event may include at least one of Service Specific Info, Address information, Registration ID, or Proxy Server MAC address information. That is, the Primitive of the receive event may include updated proxy service related information and is not limited to the aforementioned embodiment. For example, the receive event may be omitted and is not limited to the aforementioned embodiment.

TABLE 24

Receive( id, peer_instance_id, service_specific_info, address, registration_ID, proxy_server_mac_addr )

Id: As original publish_id or subscribe_id returned by the instance of the Publish or the Subscribe function
peer_instance_id: Identifier of the Publish function or the Subscribe function in the NAN Device from which this follow-up message was received.
service_specific_info: Sequence of values which were decoded from the received frame
Address: NAN Interface Address of the NAN Device from which the frame was received
Registration_ID: ID value received from Proxy server during registration of first service
proxy_server_mac_addr: MAC (NAN interface) address of Proxy server In this case, for example, the NAN proxy client 1530 may determine whether proxy service consignment is maintained based on updated proxy service information. For example, to maintain an updated proxy service, the NAN proxy client 1530 may maintain a sleep state with a period like a conventional case.

For example, not to maintain the updated proxy service, the NAN proxy client 1530 may transmit Proxy Deregistration Request to the NAN proxy server 1520.

Then, the NAN proxy client 1530 may receive Proxy Deregistration Response from the NAN proxy server 1520. Thereby, the NAN proxy client 1530 may perform deregistration on the NAN proxy server 1520.

FIG. 16 is a diagram showing a method of performing a proxy registration update procedure.

The NAN proxy server may provide a proxy service instead of the registered NAN proxy client. In this case, the NAN proxy server may provide the proxy service for a predetermined time period based on a TTL value. In this case, for example, an update procedure of the proxy service may be performed before a TTL value elapses.

For example, referring to FIG. 16(a), upon transmitting the Proxy Registration Update Request to an NAN proxy server 1620 and, then, receiving the Proxy Registration Update Response, an NAN proxy client 1630 may perform an update procedure. In this case, information included therein has been described above with reference to FIG. 15.

For example, referring to FIG. 16(b), the NAN proxy server 1620 may transmit the Proxy Registration Update Request to the NAN proxy client 1630. In this case, for example, the NAN proxy server 1620 may transmit the Proxy Registration Update Request to the NAN proxy client 1630 to check whether information on a proxy service is changed. The NAN proxy server 1620 may ask the NAN proxy client 1630 whether update is performed.

That is, the Proxy Registration Update Request may be triggered by any one of the NAN proxy server 1620 and the NAN proxy client 1630. The NAN proxy server 1620 may also perform an operation of checking whether an update procedure of the proxy service is needed.

Upon transmitting the Proxy Registration Update Request to the NAN proxy client 1630, the NAN proxy server 1620 may receive the Proxy Registration Update Response from the NAN proxy client 1630. In this case, for example, information included in the Proxy Registration Update Request and the Proxy Registration Update Response has been described above with reference to FIG. 15.

For example, the Proxy Registration Update Request transmitted by the NAN proxy server 1620 may include only information for checking whether update is performed. In this case, for example, the Proxy Registration Update Response received by the NAN proxy server 1620 may include information on the Proxy Registration Update Request TLV field. That is, the Proxy Registration Update Request transmitted by the NAN proxy server 1620 may be a message for a query for asking whether update is performed.

For example, upon receiving the Proxy Registration Update Response, the NAN proxy server 1620 may transmit a message for a confirmation response to the NAN proxy client 1630. In this case, for example, the confirmation response message may include information on the aforementioned Proxy Registration Update Response TLV field.

That is, the NAN proxy server 1620 may check whether the proxy service is updated.

As another example, when the NAN proxy server 1620 does not receive the Proxy Registration Update Request from the NAN proxy client 1630 for a time period corresponding to a TTL value, the NAN proxy server 1620 may transmit the Proxy Registration Update Request to the NAN proxy client 1630. As another example, when the NAN proxy server 1620 does not receive the Proxy Registration Update Request from the NAN proxy client 1630 for a time period corresponding to a predetermined value smaller than a TTL value, the NAN proxy server 1620 may transmit the Proxy Registration Update Request to the NAN proxy client 1630.

That is, when the NAN proxy server 1620 does not receive the Proxy Registration Update Request from the NAN proxy client 1630 for a predetermined time period, the NAN proxy server 1620 may directly transmit the Proxy Registration Update Request.

Figure 17:
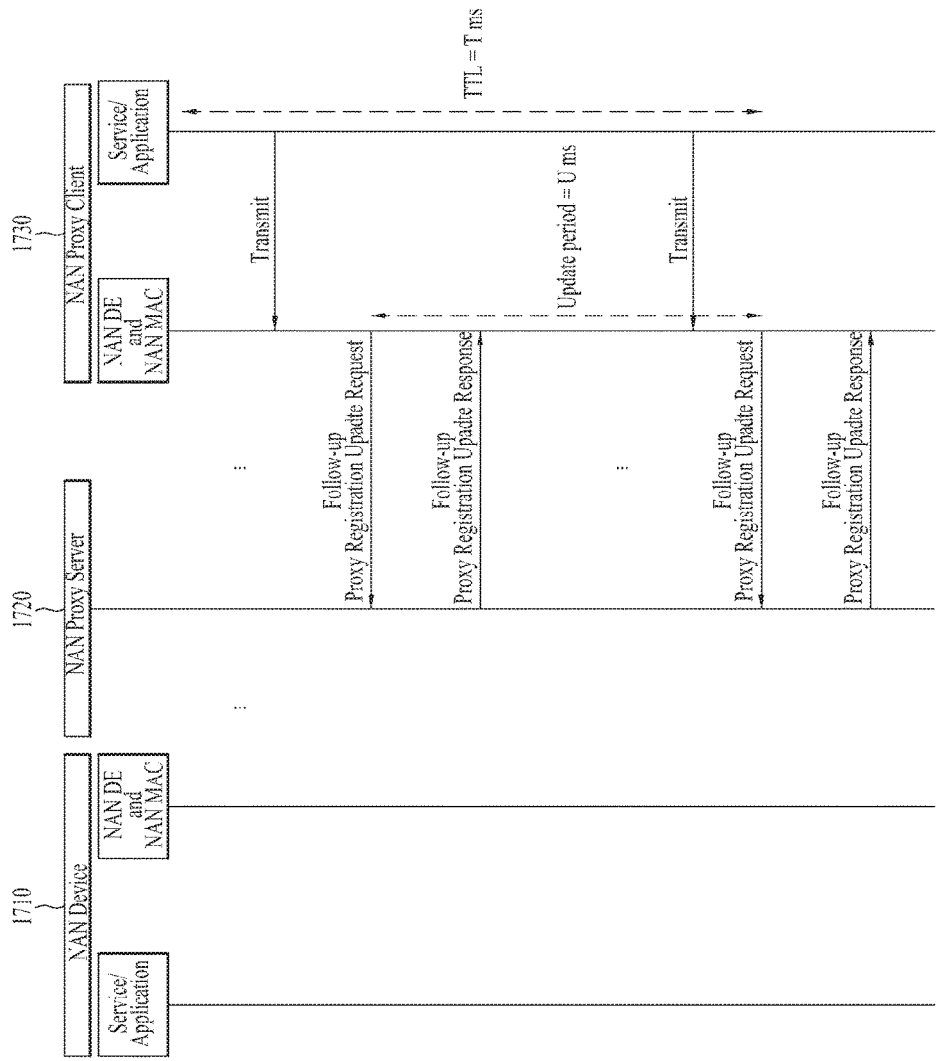
FIG. 17 is a diagram showing a method of periodically performing update on a proxy service.

FIG. 17 is a diagram showing a method of periodically performing update on a proxy service.

When the NAN proxy client is registered in the NAN proxy server, the NAN proxy server may provide a proxy service instead of the NAN proxy client. In this case, as described above, the NAN proxy server may provide the proxy service for a time period corresponding to the TTL value. In addition, upon receiving the Proxy Registration Update Request in an update procedure, the NAN proxy server may provide the proxy service based on Time to live of registered service included in the Proxy Registration Update Request TLV field.

In this case, for example, referring to FIG. 17, an NAN proxy client 1730 may periodically perform update. In this case, for example, an update period may be smaller than the TTL value. In more detail, when the TTL value is Tms and an update period is Ums, U may be smaller than a T value. That is, the NAN proxy client 1730 may perform update before the proxy service is maintained to determine whether the proxy service is maintained. Thereby, the proxy service may be prevented from being stopped. For example, an update period may be a time interval at which the Transmit method is called. That is, a starting point of the update period may be set based on Transmit. For example, the update period may be a time interval at which the Proxy Registration Update Request is transmitted. That is, a starting point of the update period may be set based on the Proxy Registration Update Request.

That is, Update Request may be a period at which the update procedure is performed by the NAN proxy client 1730 and is not limited to the aforementioned embodiment.

Figure 18:
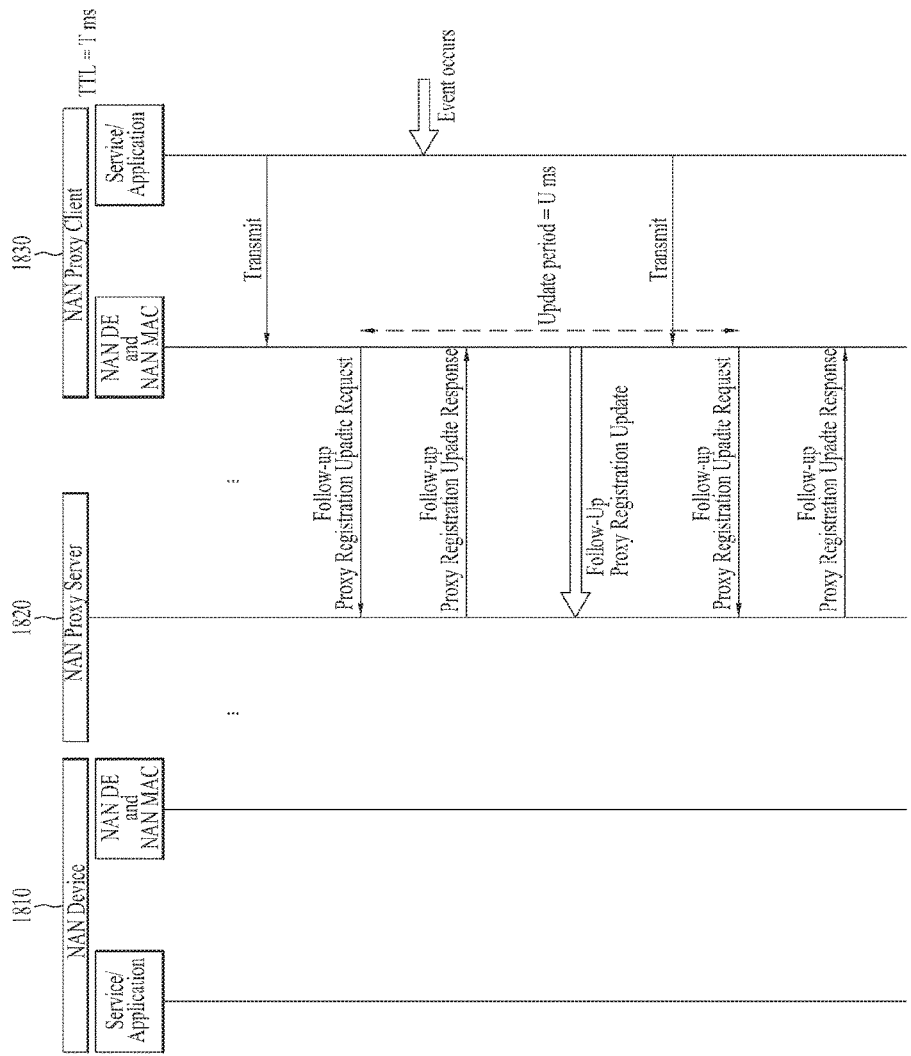
FIG. 18 is a diagram showing a method of performing update on a proxy service based on event occurrence.

FIG. 18 is a diagram showing a method of performing update on a proxy service based on event occurrence.

When the NAN proxy client is registered in the NAN proxy server, the NAN proxy server may provide the proxy service instead of the NAN proxy client. In this case, as described above, the NAN proxy server may provide the proxy service for a time period corresponding to a TTL value. In addition, upon receiving the Proxy Registration Update Request in an update procedure, the NAN proxy server may provide the proxy service based on a Time to live of registered service value included in the Proxy Registration Update Request TLV field.

In this case, for example, referring to FIG. 18, an NAN proxy client 1830 may periodically perform update. In this case, for example, an update period may be smaller than a TTL value. In this case, a configuration of the update is the same as the above description of FIG. 17.

As another example, when an event on a service during an update period, an NAN proxy client 1830 may transmit proxy registration update to an NAN proxy server 1820.

In more detail, the NAN proxy client 1830 may be awaken and may transmit the proxy registration update when an event occurs even if the update period is not reached. In this case, the event of the service may refer to a change in information on the service. For example, the event of the service may refer to a change in condition of service support. That is, the event of the service may refer to a case in which update is needed based on a change on the information on the proxy service and is not limited to the aforementioned embodiment.

The NAN proxy client 1830 may transmit the proxy registration update to the NAN proxy server 1820 to update the information on the proxy service based on the event. In this case, for example, the proxy registration update may be a different message from the aforementioned Proxy Registration Update Request and Proxy Registration Update Response. When the NAN proxy client 1830 transmits the proxy registration update to the NAN proxy server 1820 based on event occurrence, the NAN proxy server 1820 may update the proxy service on the NAN proxy client 1830.

With regard to the periodically performed update procedure, the NAN proxy client 1830 needs to also receive a response to a change in the proxy service information and to check update. However, when the update procedure is performed based on event occurrence, a current situation may be a situation in which the proxy service information needs to be changed. Accordingly, the NAN proxy client 1830 may transmit the proxy registration update to the NAN proxy server 1820. The NAN proxy server 1820 may update the information on the proxy service based on the proxy registration update and may omit an additional response.

That is, the NAN proxy client 1830 may differentiate a message transmitted based on an update period and a message transmitted based on event occurrence. For example, the proxy registration update may include at least one of the aforementioned information items included in the Proxy Registration Update Request and the Proxy Registration Update Response. That is, the proxy registration update may include information items that need to be updated based on a service change event and is not limited to the aforementioned embodiment.

Figure 19:
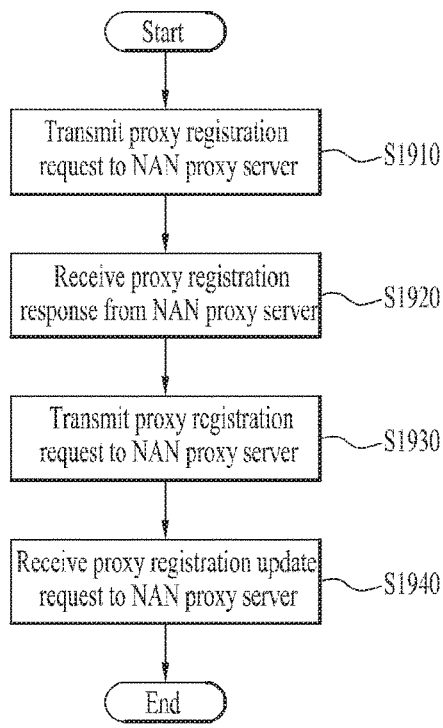
FIG. 19 is a flowchart of a method of providing a proxy service through a proxy server.

FIG. 19 is a flowchart of a method of providing a proxy service through a proxy server.

An NAN proxy client may transmit a proxy registration request to an NAN proxy server (S1910). Then, the NAN proxy client may receive a proxy registration response from the NAN proxy server (S1920). In this case, as described above with reference to FIGS. 10 to 18, upon receiving the proxy registration response, the NAN proxy client may be registered in the NAN proxy server. In this case, the NAN proxy server may instead perform a proxy service of the registered NAN proxy client. That is, the proxy service of the NAN proxy client may be consigned to the NAN proxy server.

In this case, for example, information on a time for which the proxy service is consigned may be included in the proxy registration request. In this case, the information on the time for which the proxy service is consigned may be the aforementioned TTL information. That is, for a time corresponding to the TTL information, the NAN proxy server may provide the proxy service instead of the NAN proxy client.

Then, the NAN proxy client may transmit a Proxy Registration Update Request to the NAN proxy server (S1930). Then, the NAN proxy client may receive a Proxy Registration Update Response from the NAN proxy server (S1940). In this case, as described above with reference to FIGS. 10 to 18, the NAN proxy client may transmit proxy registration update to the NAN proxy server based on an update period. In this case, the update period may be smaller than a TTL value. That is, the NAN proxy client may transmit the Proxy Registration Update Request before consignment of the proxy service is maintained. Thereby, the NAN proxy client may perform update on whether the proxy service is consigned and a service change. For example, the Proxy Registration Update Request may include Time to live of registered service information. In this case, when the NAN proxy server receives the Proxy Registration Update Request, the NAN proxy server may update a consignment time of the proxy service based on a time corresponding to the Time to live of registered service information. That is, the NAN proxy server may update a time for which the proxy service is consigned based on information included in the Proxy Registration Update Request. In addition, the NAN proxy client may receive the Proxy Registration Update Response from the NAN proxy server. Thereby, the NAN proxy client may check that the consignment of the proxy service is updated. In addition, the NAN proxy client may acquire proxy service change information, as described above.

Figure 20:
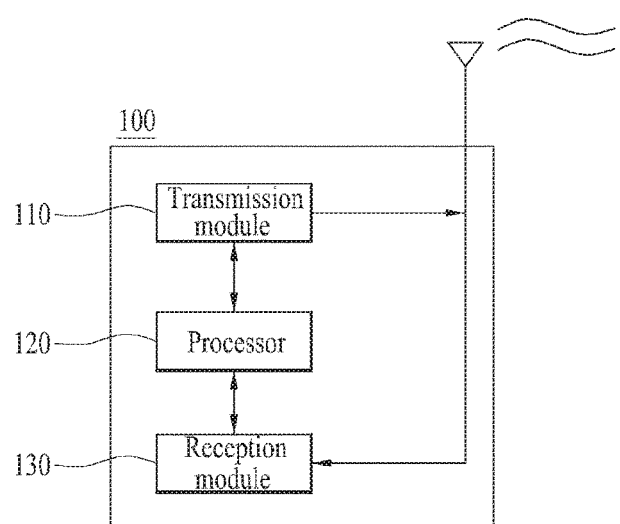
FIG. 20 is a block diagram for a terminal device.

FIG. 20 is a block diagram for a terminal device.

A terminal device may correspond to a NAN terminal. In this case, for example, the NAN terminal may correspond to a terminal playing a role of a NAN proxy server. And, the NAN terminal may correspond to a terminal playing a role of a NAN proxy client. And, the NAN terminal may correspond to a terminal performing discovery with the NAN proxy server.

In this case, the terminal device 100 can include a transmission module 110 configured to transmit a radio signal, a reception module 130 configured to receive a radio signal, and a processor 120 configured to control the transmission module 110 and the reception module 130. In this case, the terminal 100 can perform communication with an external device using the transmission module 110 and the reception module 130. In this case, the external device may correspond to a different terminal device. And, the external device may correspond to a base station. In particular, the external device may correspond to a device capable of performing communication with the terminal device 100, by which the present invention may be non-limited. The terminal device 100 can transmit and receive digital data such as contents using the transmission module 110 and the reception module 130. And, the terminal device 100 can exchange a beacon frame, a service discovery frame, and the like using the transmission module 110 and the reception module 130, by which the present invention may be non-limited. In particular, the terminal device 100 performs communication using the transmission module 110 and the reception module 130 and may be able to exchange information with an external device.

According to an embodiment of the present specification, the processor 120 of the terminal device 100 may register the NAN proxy client. The processor 120 may transmit a proxy registration request to the NAN proxy server using the transmission module 110. The processor 120 may receive a proxy registration response from the NAN proxy server using the reception module 130 and, thereby, may be registered in the NAN proxy server.

The processor 120 may transmit a Proxy Registration Update Request to the NAN proxy server using the transmission module 110. Then, the processor 120 may receive the Proxy Registration Update Response from the NAN proxy server using the reception module 130, as described above. In this case, the proxy registration request may include information on the TTL of the proxy service. The processor 120 may consign the proxy service to the NAN proxy server for a time corresponding to the TTL of the proxy service. In this case, the Proxy Registration Update Request may be periodically updated based on an update period. For example, the update period may be set to be smaller than the time corresponding to the TTL of the proxy service, as described above.

The embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

And, both an apparatus invention and a method invention are explained in the present specification and the explanation on both of the inventions can be complementally applied, if necessary.

INDUSTRIAL APPLICABILITY

Although the present invention is explained under the assumption that the present invention is applied to a NAN wireless communication system, by which the present invention may be non-limited. The present invention can be applied to various wireless systems using the same scheme.

The invention claimed is:

1. A method of updating a proxy service by a neighbor awareness networking (NAN) proxy client in a wireless communication system, the method comprising:
   transmitting a Proxy Registration Request to an NAN proxy server;
   receiving a Proxy Registration Response from the NAN proxy server;
   transmitting a Proxy Registration Update Request to the NAN proxy server; and
   receiving a Proxy Registration Update Response from the NAN proxy server,
   wherein the Proxy Registration Request comprises information on Time to live (TTL) of a proxy service;
   wherein a proxy service of the NAN proxy client is consigned to the NAN proxy server for a time corresponding to the information on the TTL of the proxy service;
   wherein the Proxy Registration Update Request is periodically transmitted based on an update period; and
   wherein the update period is set to be smaller than a time corresponding to the information on the TTL of the proxy service.

2. The method according to claim 1, wherein the Proxy Registration Update Request comprises information on TTL of a registered service.

3. The method according to claim 2, wherein, when the NAN proxy server receives the Proxy Registration Update Request, a time for which the proxy service of the NAN proxy client is consigned is updated based on the TTL of the registered service.

4. The method according to claim 3, wherein the update period is set to be smaller than a time corresponding to the TTL of the registered service.

5. The method according to claim 1, wherein, when a service change event occurs during the update period, the NAN proxy client transmits the proxy registration update to the NAN proxy server before a time corresponding to the update period is reached.

6. The method according to claim 5, wherein, when the proxy registration update is transmitted to the NAN proxy server before the time corresponding to the update period is reached, the NAN proxy server updates the proxy service based on the proxy registration update.

7. The method according to claim 1, wherein, when the NAN proxy client does not transmit the Proxy Registration Update Request for a predetermined time after receiving the proxy registration response, the NAN proxy server transmits the Proxy Registration Update Request to the NAN proxy client.

8. The method according to claim 7, wherein, when the Proxy Registration Update Request is received from the NAN proxy server, the Proxy Registration Update Response is transmitted to the NAN proxy server.

9. The method according to claim 7, wherein the predetermined time is set to be smaller than a time for which the proxy service is consigned and is set to be greater than the update period.

10. A neighbor awareness networking (NAN) proxy client for updating a proxy service in a wireless communication system, the NAN proxy client comprising:
    a reception module configured to receive information from an external device;
    a transmission module configured to transmit information to the external device; and
    a processor configured to control the reception module and the transmission module;
    wherein the processor transmits a Proxy Registration Request to an NAN proxy server using the transmission module, receives a Proxy Registration Response from the NAN proxy server using the reception module, transmits a Proxy Registration Update Request to the NAN proxy server using the transmission module, and receives a Proxy Registration Update Response from the NAN proxy server using the reception module,
    wherein the Proxy Registration Request comprises information on Time to live (TTL) of a proxy service;
    wherein a proxy service of the NAN proxy client is consigned to the NAN proxy server for a time corresponding to the information on the TTL of the proxy service;
    wherein the Proxy Registration Update Request is periodically transmitted based on an update period; and
    wherein the update period is set to be smaller than a time corresponding to the information on the TTL of the proxy service.

11. The NAN proxy client according to claim 10, wherein the Proxy Registration Update Request comprises information on TTL of a registered service.

12. The NAN proxy client according to claim 11, wherein, when the NAN proxy server receives the Proxy Registration Update Request, a time for which the proxy service of the NAN proxy client is consigned is updated based on the TTL of the registered service.

13. The NAN proxy client according to claim 12, wherein the update period is set to be smaller than a time corresponding to the TTL of the registered service.

14. The NAN proxy client according to claim 10, wherein, when a service change event occurs during the update period, the NAN proxy client transmits the proxy registration update to the NAN proxy server before a time corresponding to the update period is reached.

15. The NAN proxy client according to claim 14, wherein, when the proxy registration update is transmitted to the NAN proxy server before the time corresponding to the update period is reached, the NAN proxy server updates the proxy service based on the proxy registration update.

* * * * *